US012354045B2

(12) United States Patent
Evans et al.

(10) Patent No.: US 12,354,045 B2
(45) Date of Patent: Jul. 8, 2025

(54) ORCHESTRATED INTELLIGENT SUPPLY CHAIN OPTIMIZER

(71) Applicant: Oii, Inc., Oakland, CA (US)

(72) Inventors: David Michael Evans, Welwyn Garden City (GB); Robert Derward Rogers, Oakland, CA (US)

(73) Assignee: Oii, Inc., Oakland, CA (US)

( * ) Notice: Subject to any disclaimer, the term of this patent is extended or adjusted under 35 U.S.C. 154(b) by 0 days.

(21) Appl. No.: 17/102,103

(22) Filed: Nov. 23, 2020

(65) Prior Publication Data

US 2021/0158259 A1   May 27, 2021

Related U.S. Application Data

(60) Provisional application No. 63/089,542, filed on Oct. 8, 2020, provisional application No. 62/940,014, filed on Nov. 25, 2019.

(51) Int. Cl.
*G06Q 10/0637* (2023.01)
*G06Q 10/0631* (2023.01)
*G06Q 10/0639* (2023.01)

(52) U.S. Cl.
CPC . *G06Q 10/06375* (2013.01); *G06Q 10/06315* (2013.01); *G06Q 10/0639* (2013.01)

(58) Field of Classification Search
CPC ....... G06Q 10/06315; G06Q 10/06375; G06Q 10/0637; G06Q 10/0639; G06Q 10/067;
(Continued)

(56) References Cited

U.S. PATENT DOCUMENTS 6,151,582 A * 11/2000 Huang ............... G06Q 10/0637
705/7.31
8,015,081 B1 * 9/2011 Franco ............... G06Q 30/0601
705/28
(Continued)

FOREIGN PATENT DOCUMENTS

CA    2336368 A1 * 1/2000 ............. G06Q 10/06
EP    0770967    * 5/1997 ............. G06F 17/60
(Continued)

OTHER PUBLICATIONS

D. McCollough, A. Santhoshkumar, S. Das and W. J. Headrick, "Adaptive Predictive Modeling for Supply Chains," 2019 IEEE AUTOTESTCON, 2019, pp. 1-4, doi: 10.1109/AUTOTESTCON43700.2019.8961039 (Year: 2019).*
(Continued)

*Primary Examiner* — Jerry O'Connor
*Assistant Examiner* — Matthew H Divelbiss
(74) *Attorney, Agent, or Firm* — Daniel Maffeo

(57) ABSTRACT

The present invention relates to systems and methods for intelligently optimizing supply chain is provided. In particular, the systems and methods provide the capability to configure supply chain systems so as to: balance between cost and service is optimised and profitability maximised; configure system parameters to respond to both current and future risks; ensure that variability is built into plans enabling maximised efficiency; and human error and bias are eliminated from the planning process such that pro-active rather than reactive behaviour becomes the norm.

15 Claims, 13 Drawing Sheets

Orchestrated Intelligent Supply Chain Ecosystem

(58) Field of Classification Search
CPC ...... G06Q 10/087; G06Q 50/04; G06Q 50/28; G06T 11/206
See application file for complete search history.

(56) References Cited

U.S. PATENT DOCUMENTS

| | | | | |
|---|---|---|---|---|
| 11,093,884 | B2* | 8/2021 | Devarakonda | G06F 3/0486 |
| 11,403,573 | B1* | 8/2022 | Chapados | G06Q 10/087 |
| 2004/0230829 | A1* | 11/2004 | Dogan | G06Q 10/063 726/1 |
| 2008/0208659 | A1* | 8/2008 | An | G06Q 10/06375 705/7.38 |
| 2009/0160856 | A1* | 6/2009 | Hoguet | G06T 17/00 345/420 |
| 2012/0083914 | A1* | 4/2012 | Kocis | G06F 30/20 700/100 |
| 2015/0120373 | A1* | 4/2015 | Bajaj | G06Q 10/0635 705/7.25 |
| 2016/0019568 | A1* | 1/2016 | Batrakov | G06Q 10/0875 705/7.31 |
| 2019/0073611 | A1 | 3/2019 | Sahota et al. | |
| 2020/0175630 | A1* | 6/2020 | Bajaj | G06Q 10/06375 |
| 2020/0210947 | A1* | 7/2020 | Devarakonda | G06Q 10/06312 |
| 2020/0279212 | A1* | 9/2020 | Kubota | B65G 61/00 |
| 2022/0172139 | A1* | 6/2022 | Brooks | G06N 7/01 |

FOREIGN PATENT DOCUMENTS

| | | |
|---|---|---|
| EP | 1793334 | 6/2007 |
| WO | WO2018/217692 | 11/2018 |
| WO | WO2019/064790 | 4/2019 |

OTHER PUBLICATIONS

Hongwei Ding, C. Hans, L. Benyoucef, J. Schumacher and X. Xie, ""ONE" a new tool for supply chain network optimization and simulation," Proceedings of the 2004 Winter Simulation Conference, 2004., 2004, pp. 1404-1411 vol. 2, doi: 10.1109/WSC.2004.1371479 (Year: 2004).*

Stefanovic N. Proactive supply chain performance management with predictive analytics. ScientificWorldJournal. 2014;2014: 528917. doi:10.1155/2014/528917 (Year: 2014).*

K. Grzybowska and G. Kovács, "Sustainable supply chain— Supporting tools," 2014 Federated Conference on Computer Science and Information Systems, 2014, pp. 1321-1329, doi: 10.15439/2014F75 (Year: 2014).*

Blackhurst et al. "Supply chain vulnerability assessment: A network based visualization and clustering analysis approach", Journal of Purchasing and Supply Management, vol. 24, Issue 1, pp. 21-30, ISSN 1478-4092, https://doi.org/10.1016/j.pursup.2017.10.004. (Year: 2018).*

Hongwei Ding, "One" a New Tool for Supply Chain Network Optimization and Simulation, 2004, Proceedings of the 2004 Winter Simulation Conference.*

Hongwei Ding, "One" A New Tool for Supply Chain Network Optimization and Simulation, 2004, Proceedings of the 2004 Winter Simulation Conference (Year: 2004).*

ISA/European Patent Office, "International Search Report" and "Written Opinion of the International Searching Authority," in PCT Application No. PCT/IB2020/001119, May 3, 2021, 9 pages.

European Patent Office, Communication pursuant to Rules 161(1) and 162 EPC in Application No. 20855821.3, May 7, 2022, 3 pages.

WIPO, International Preliminary Report on Patentability, in PCT Application No. PCT/IB2020/001119, May 3, 2021, 7 pages.

European Patent Office, Communication pursuant to Article 94(3) EPC in Application No. 20855821.3, Jun. 19, 2024, 6 pages.

* cited by examiner

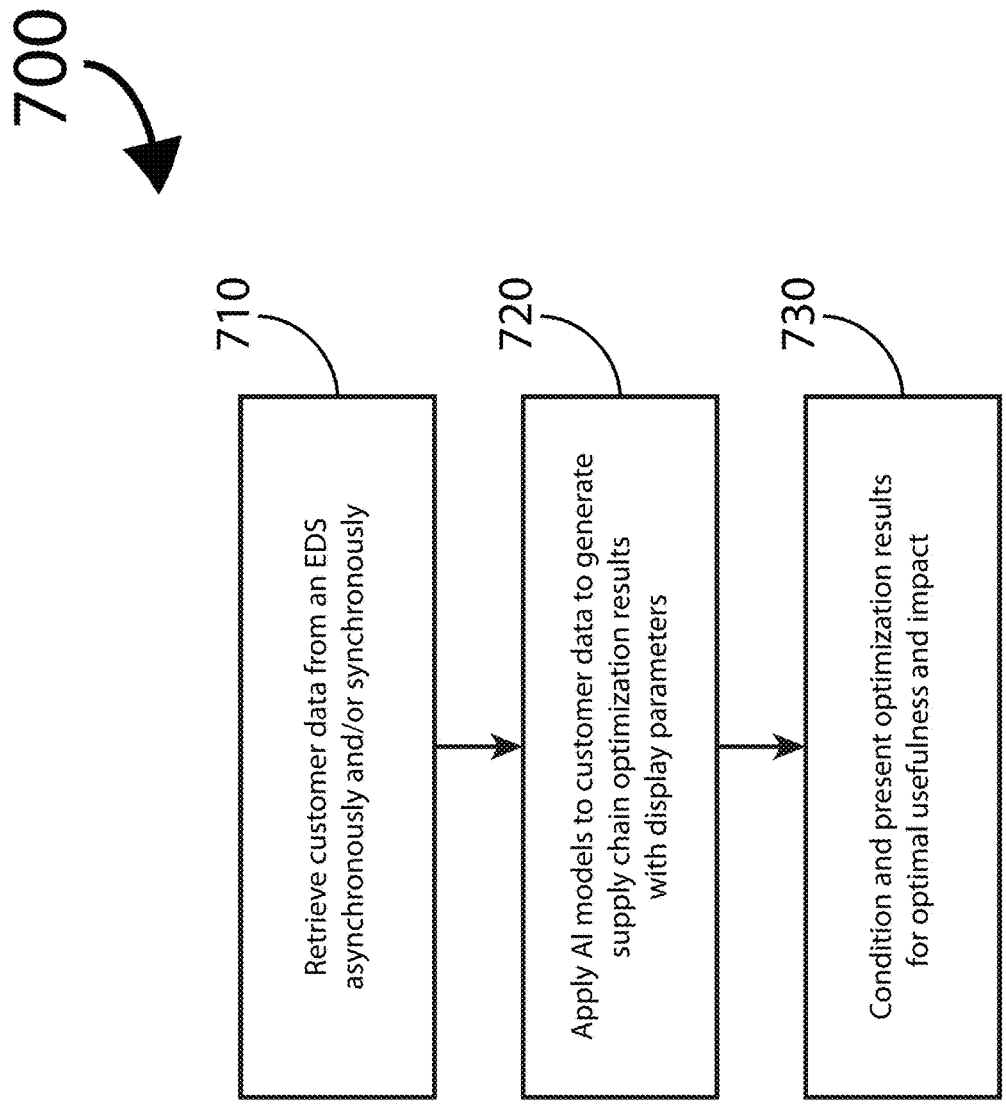

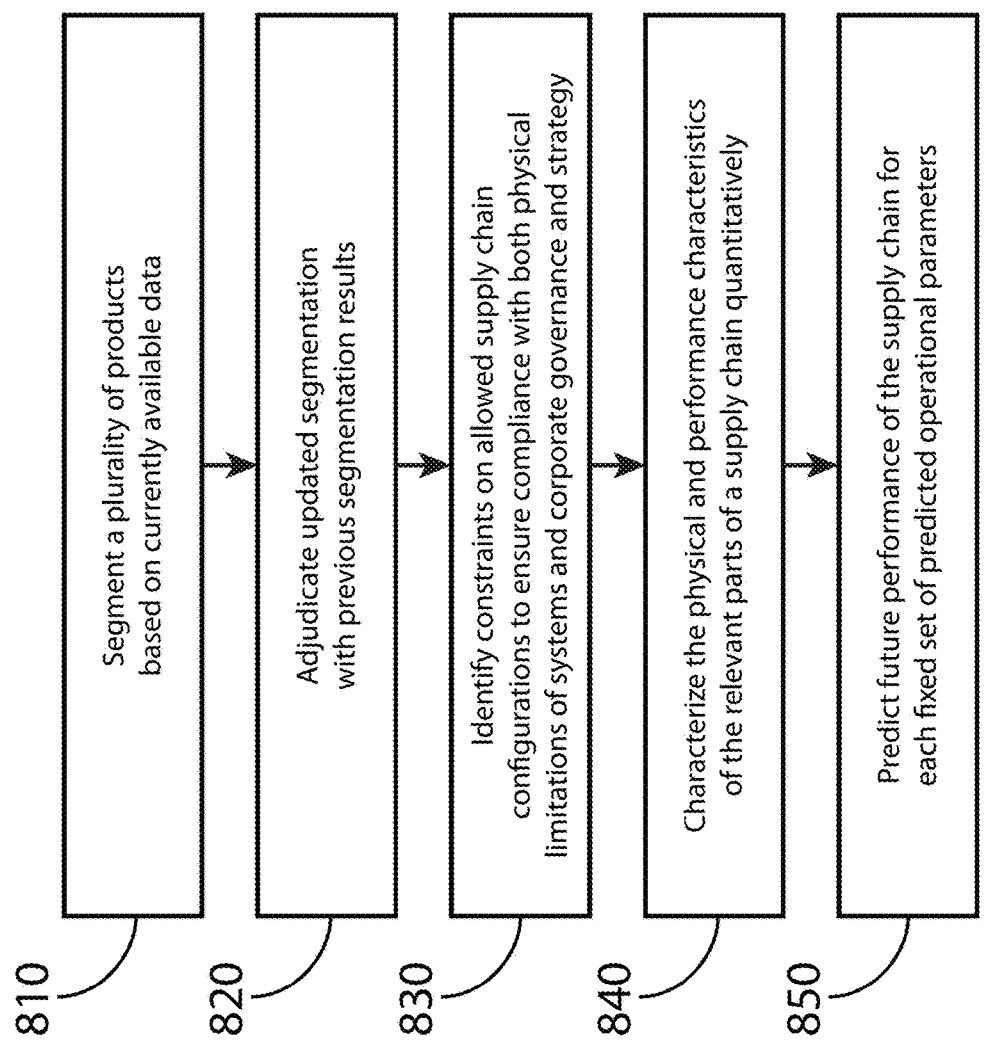

ORCHESTRATED INTELLIGENT SUPPLY CHAIN OPTIMIZER

CROSS REFERENCE TO RELATED APPLICATIONS

This non-provisional application claims the benefit and priority of U.S. Provisional Application No. 62/940,014, filed on Nov. 25, 2019, and U.S. Provisional Application No. 63/089,542, filed on Oct. 8, 2020, both pending and of the same title, which applications are incorporated herein in their entirety by this reference.

BACKGROUND

The present invention relates to systems and methods for orchestrating an intelligent supply chain optimizer.

Configuring a supply chain planning system correctly is a complex task and one that most planning systems do not address. Identifying and configuring the optimal supply chain requires multivariate mathematical modelling and a near infinity of potential settings, despite this supply chains typically are configured manually. Supply chain planning systems rely on Planners to set the right parameters even though failure to find the optimal parameters results in ineffective plans that will propagate across the network, regardless of the effectiveness of the software.

Why is it an issue to leave this in the hands of the planner? Because finding the right configuration—even in relatively simple supply chains—is extremely difficult to achieve. There are just too many variables to consider and multitude of potential service versus cost outcomes. In addition, real-world supply chains are often global, making the task exponentially more complicated. Even for experienced planners this is an insurmountable challenge.

As a result, many supply chains are set up and planned in a suboptimal way resulting in a combination of issues such as Service Failures and Missed Sales, Overstocks on some items and under-stock on others, Factory Inefficiencies, Reactive rather than Strategic Plans, High Costs of Waste (for example when products expire while in inventory).

Identifying the set up requires detailed evaluation of the cost versus service implications of the millions of potential configuration options across the end-to-end supply chain network encompassing dimensions such as Supply Chain Variability, Network Design, Product segmentation, Inventory Strategy, Factory sequence and rhythm.

Artificial Intelligence and machine learning techniques (AI/ML) are a new generation of algorithms that demonstrate self-learning and the capability to make decisions. Its power is its ability to process multiple data inputs simultaneously and to use this information to: compare outcomes, make informed choices and to self-correct so that those choices improve over time.

It is therefore apparent that there is an urgent need to use Artificial Intelligence (AI) in business to provide intelligently optimized supply chain solutions. In reality, finding the right human-algorithm balance is critical. Whilst algorithms are great at finding the best opportunity in billions, the underlying strategy is down to the supply chain stakeholder—the person who knows what strategic direction the respective business model(s) should take.

SUMMARY

To achieve the foregoing and in accordance with the present invention, systems and methods for intelligently optimizing supply chain is provided. In particular, the systems and methods provide the capability to configure supply chain systems so as to: balance between cost and service is optimised and profitability maximised; configure system parameters to respond to both current and future risks; ensure that variability is built into plans enabling maximised efficiency; and human error and bias are eliminated from the planning process such that pro-active rather than reactive behaviour becomes the norm.

In some embodiments, the end-to-end Orchestrated Intelligent Supply chain solution uses a subfield of machine learning called reinforcement learning. These algorithms are based on the idea that the machine 'lives' in the supply chain environment and takes actions to find the optimum—known as a policy—based on specified rewards. This allows supply chain optimizations to be found across the entire supply chain.

The optimal model is therefore one which takes into account strategic factors such as network design, product segmentation strategy, manufacturing sequence and rhythm, and inventory strategy.

The best solution is one that balances your segmented service level targets against current and future opportunities. It is dynamic; continually recalibrating to take account of new data points and changes to underlying variability patterns and trends in the data. It will adapt in the face of the most extreme challenges facing the enterprise.

The Cognitive Self-Modelling Supply Chain system described herein automatically identifies the RIGHT configuration to meet the strategic goals of the organization with the optimal service cost settings across the network. OI models and projects the future supply chain based on the variables and constraints in the data, considers the millions of options that are available in real time and identifies a costed and optimized solution which is the best fit for the organization.

It does this dynamically; continually recalibrating to take account of new data points and changes to underlying variability patterns and trends in the data. It will adapt as new patterns emerge and the goals of the enterprise evolve so that configuration remains correct as new challenges and risks surface.

This invention finds an optimal model that ensures the balance between cost and service is optimized and profitability maximized, the system parameters are configured to respond to both current and future risks, variability is built into plans enabling maximized efficiency, and human error and bias are eliminated from the planning process such that pro-active rather than reactive behavior becomes the norm.

This invention does not replace the planning system or the planner. It is designed to work with the existing system, retrieving data from it to find the best solution across multiple dimensions of cost and service and then feeding this back to the planner. It is the brain that identifies the optimal network that can respond to current and future supply chain variability and risk. In doing so it enables transformational quantifiable improvement in service levels and network efficiencies simultaneously.

It works on any supply chain providing the flexibility to provide organization specific strategic direction and constraints to be built into the calibration of the final recommended supply chain configuration. It works both in a modular section of the supply chain and across an entire network depending on the configuration needs of the company.

An underlying principle of the current invention is that it lets the data speak for itself. It analyses, classifies and delineates patterns that humans cannot perceive; augmenting planner performance and translating Randomness into Form, Form into Configuration, and Configuration into Savings and Profits.

In modelling the best set up for the network it transforms the planning process and answers key questions such as: What is the optimal network set up? What replenishment models should be applied? What is our segmented service level strategy? What is the optimal design for the supply chain network? Where in the network should stocks be held? What Safety Stock Levels should we hold? What is the optimal delivery frequency? What is the best sequence of supply plans?

As well as modelling the supply chain, the tool measures performance against the optimal configuration enabling concurrent fine-tuning. As the variables change, the software re-calibrates: monitoring everything, configuring in real time and flagging high priority issues.

This invention aligns the power of AI/ML with a science-based modelling capability. It unlocks the hidden benefits latent in your planning systems by automating the configuration of the network and maintaining the optimal state as new risks and opportunities emerge. It introduces a new paradigm of cost management, responsiveness and service to the enterprise: it is the Cognitive Self-Modelling Supply Chain.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which:

FIGS. 7 and 8 are flow diagrams illustrating the operation of the Optimizer of FIG. 2;

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "always," "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

Figure 1:
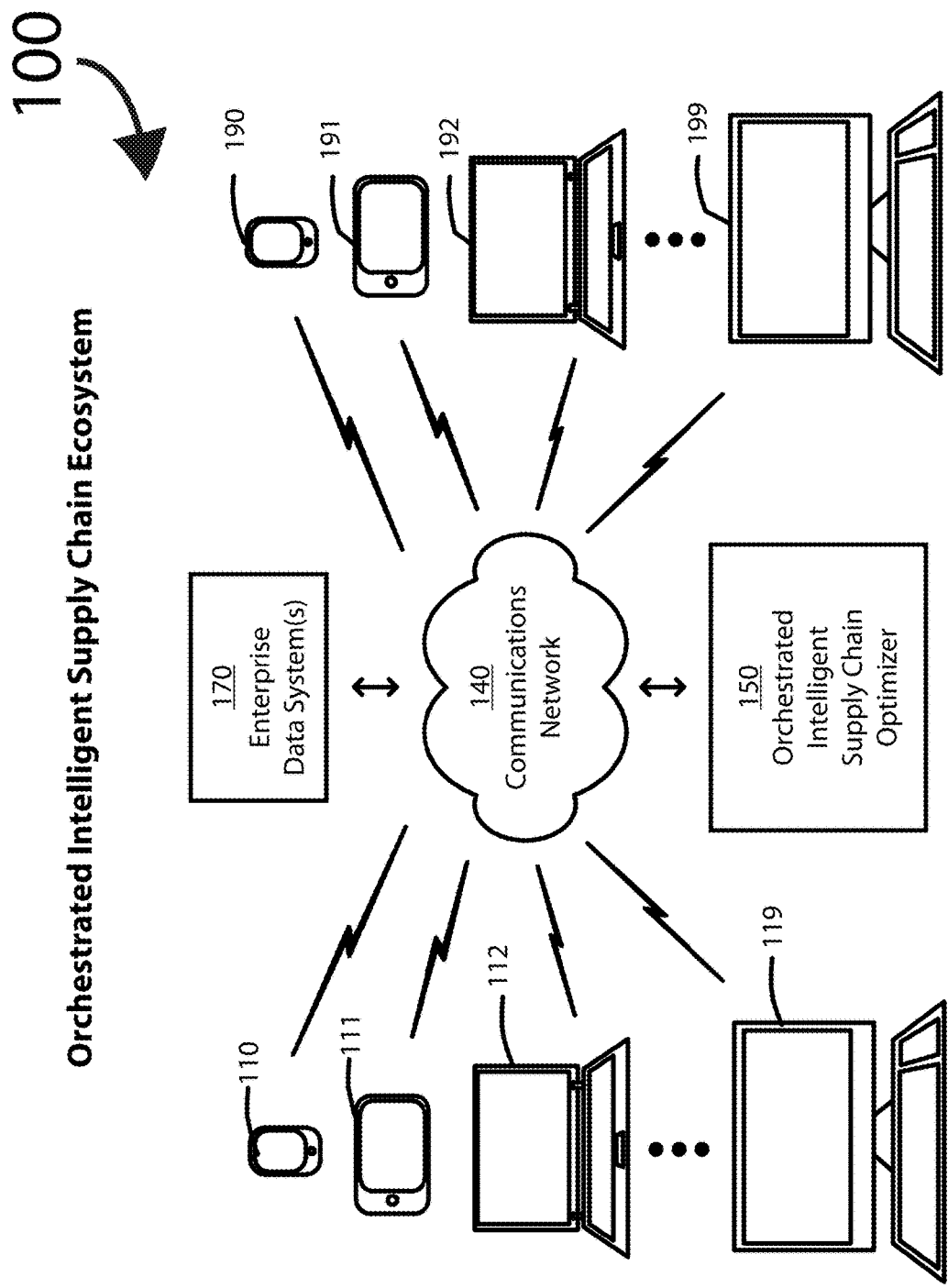
FIG. 1 is a block diagram illustrating an Orchestrated Intelligent Supply Chain Ecosystem, in accordance with one embodiment of the present invention.

The present invention relates to systems and methods for orchestrating an intelligent optimized supply chain. To facilitate discussion, FIG. 1 is a block diagram of an Orchestrated Intelligent Supply Chain Ecosystem 100 illustrating an Orchestrated Intelligent Supply Chain Optimizer 150 coupled to Enterprise Data System(s) 170 and stakeholders' communication devices 110 . . . 119 and 190 . . . 199 via a communication network 140 such as the Internet. Depending on the implementation, exemplary stakeholders can include one or more groups of managers (including, but not limited to, operations managers, supply chain managers, IT managers), planners, data scientists, data miners, data engineers, data providers, manufacturers, distributors, and retailers.

Figure 2:
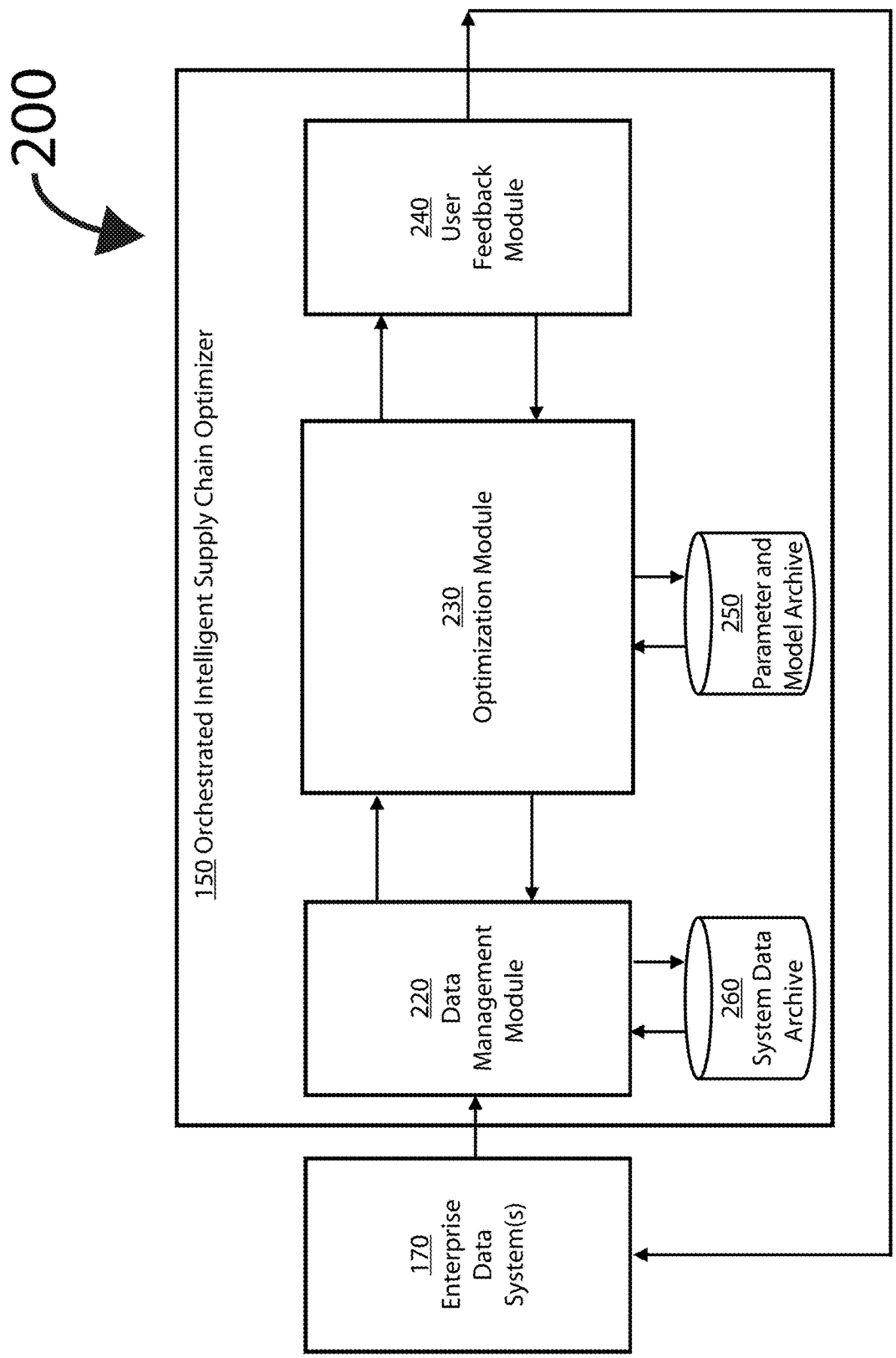
FIG. 2 is a block diagram illustrating one embodiment of an Optimizer for the Ecosystem of FIG. 1.

Referring to FIG. 2, the Data Management Module 220 configures connections to data from customer enterprise data systems (EDS) and receives these data in both asynchronous processes (batch data import) and synchronous processes (ongoing/live data feeds). These data are then combined with any system data previously stored in System Data Archive 260 to create a representation of the supply chain network. This data is of four distinct types (examples are not exhaustive): Item Master Data (fixed data related to the item): code, description, price, UOM etc.; Item Parameter Data which determines how the network is currently planned. Examples are Current Safety Stock Levels, Delivery Frequency, Order Multiples; Supply Chain Variability data—Examples are product—level monthly demand history, delivery performance history or characteristics; Strategic Objective Parameters/Constraints such as Service Targets, Site sensitivity to complexity, cost of holding stock, Transport Costs etc.

In Data Management Module 220, data are transformed as needed to ensure compatibility with the computational requirements of the Orchestrated Intelligent Supply Chain Ecosystem 100.

Sensitivity results from Optimized Parameters and Sensitivities Computation Module 460 which identify sensitivity of optimization results to variability in system attributes (for example, increased probability of stockout as a result of decreased delivery performance in a specific part of the network) are presented to users of the Data Management Module 220 to inform Data Management activities. In the example given above (stockout as a function of delivery performance) this capability would identify the need to measure delivery performance more accurately, improve delivery performance in a specific part of the network, or both.

When the permissions of the logged-in users do not allow access to view or change some data in the Orchestrated Intelligent Supply Chain Ecosystem 100 appropriate selection and filtering of data may be performed in this module.

In some embodiments, the Data Management Module 220 tracks ongoing differences between the parameters that were recommended by the OI system at the time of the last parameter export and the parameters deployed in the system of record (imported through customer database). This process of creating a baseline at each export, updating supply chain characteristics such as total cost, total inventory, end-to-end supply chain throughput and lead time variability (all of which may be broken down in a number of ways including by network, subnetwork, node, region, leafSKU, productSKU, product family, among many others) and updating recommended parameters upon data export represents critical functionality for supply chain managers and organizational leaders. In some embodiments these data are represented in tabular and graphical forms in the OI user interface.

In Optimization Module 230, the primary optimization and analysis functions of the Orchestrated Intelligent Supply Chain Optimizer 150 are executed. This module receives data from the Data Management Module 220 and from 250 Parameter and Model Archive. It also interacts with the user to input/update strategic objective parameters and constraints that are used to inform the tradeoffs and cost function used in the optimization process.

While Item Master, Item Parameter and Variability data is set and unchanging based on imports (using the most up to date information in 220) Strategic Objective Parameters/Constraints are defined by the user as a driver of the way the optimization process works influencing sensitivity of the model to particular goals and constraints and enabling a level of interactive-ness in the modelling process.

Several analytical processes are performed in Optimization Module 230, including segmentation of products based on most recent available data and adjudication of updated segmentation with previous segmentation results, determination of current supply chain network (which in some embodiments includes use of machine learning and AI models to recommend improvements upon an existing network and facilitate implementation of these improvements, a.k.a. AI-augmented network design optimization), prediction of future performance of the supply chain network for different supply chain parameter settings based on a variety of supply chain network configuration assumptions, analysis of optimal supply chain parameter settings given both strategic objectives (e.g. desired Service Levels (SL) for individual products or groups of products) and system-level constraints (e.g. upper limits of the number of orders a supply site can service per time period), and optimization of the presentation of results to planners and other users (in some embodiments, machine learning and/or AI models are used to recommend contents and display parameters of supply chain optimization results).

Optimization Module 230 records results of the various computations (AI-augmented network design optimization) along with user parameter selections and other computational results (e.g. cost and performance implications of choosing non-optimal parameters) in 250 Parameter and Model Archive.

Optimization Module 230 presents the optimized results to users in the User Feedback Module 240 where users (e.g. planners) interact with these results, and the results of such interactions are then transmitted back to the Optimization Module 230 as part of the Machine Learning process driving further optimization of the ML and AI models used by the module. The data is archived so that past decisions can be restored.

User Feedback Module 240 receives results from the Optimization Module 230 that have been conditioned for optimal usefulness and impact. The user may interact with these results in a number of ways, including but not limited to accepting the recommended parameters, modifying the recommended parameters, rejecting the recommended parameters, commenting on results, initiating requests and actions based on the results (for example, a request to modify a network or system constraint, or change a Service Level value for one or more products or segments) and submitting and/or exporting results to the planning system for implementation. Feedback, responses, comments, requests and other input from users are sent back to the Optimization Module 230 for further processing. In some embodiments, feedback, responses, requests and other input from users are sent to other customer systems outside the Orchestrated Intelligent Supply Chain Optimizer 150 as well.

The Parameter and Model Archive 250 acts as a system for storage and retrieval of information relating to the optimization and feedback process, including but not limited to: information relating to past and current model parameters, model designs, user inputs, system settings, supply chain network optimizations, recommendations and changes, intermediate computational results, computed implications of user decisions and inputs, and in some embodiments external inputs to the network design process generated by machine learning and AI systems operating on data external to the system (e.g. financial projections, news articles about markets, companies and products, social media, etc.). This archive acts as a system of record for which parameters values were recommended by the Orchestrated Intelligent Supply Chain Optimizer 150 and which values were actually put into operation by planners. As such it enables the Orchestrated Intelligent Supply Chain Optimizer 150 to both model the optimal supply chain configuration but to also monitor compliance with the recommendations to flag where failure to comply resulted in costs/issues. It also enables utilization of past results versus actuals as a means to facilitate the self-learning aspect of the ML model such that future configurations improve as the model gains more insight on what decisions drive the best outcomes.

Figure 3:
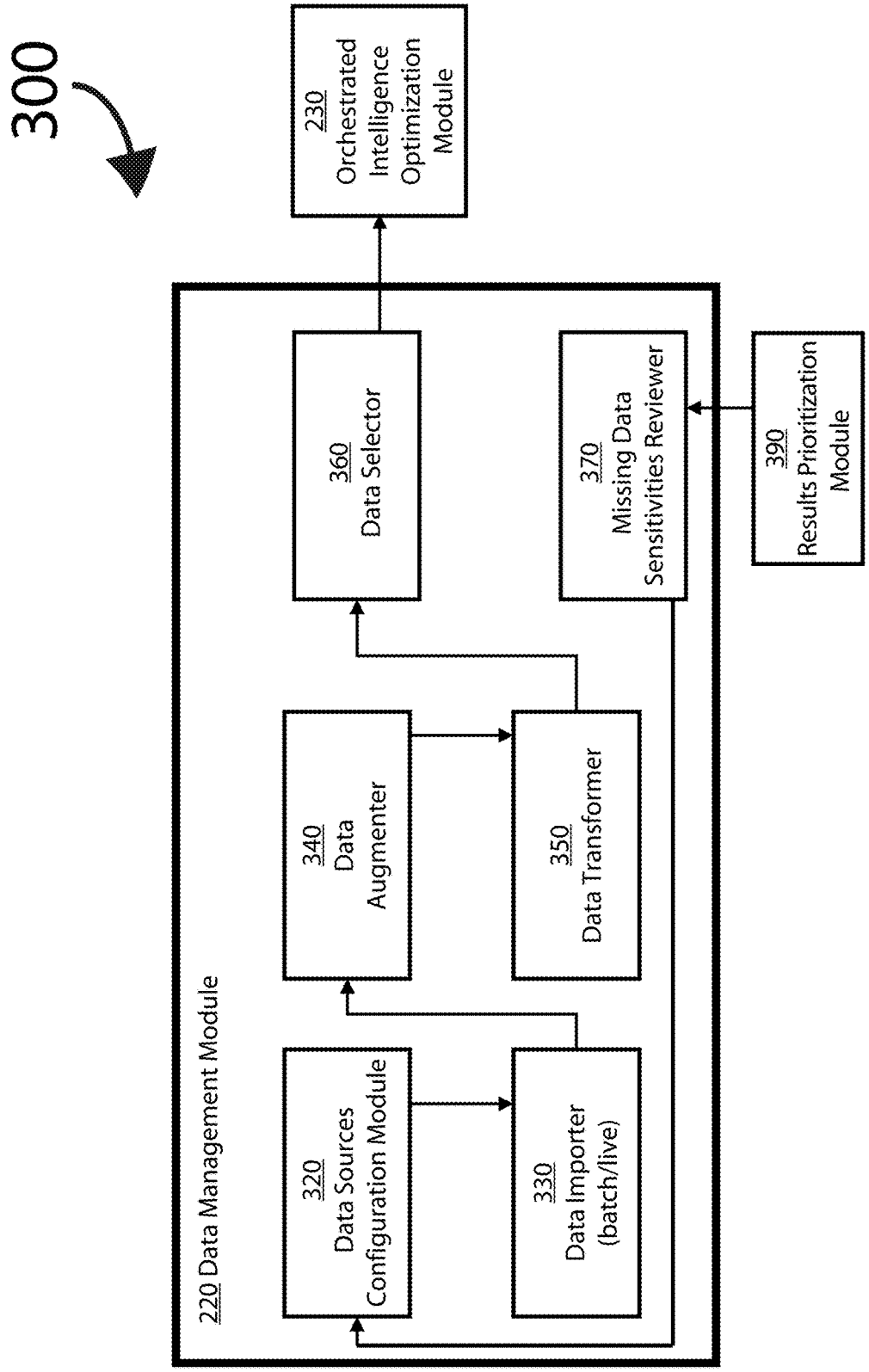
FIGS. 3-6 are block diagrams detailing the Optimizer of FIG. 2.

As shown in FIG. 3, Module Data Sources Configuration Module 320 enables users to define data sources and the interfaces required to access them. Data sources may be asynchronous (e.g. batch import) or synchronous (live data for example, pushed by customer systems or queried from live systems on an ongoing basis). Multiple data sources and information systems are expected to be configured for use in the Orchestrated Intelligent Supply Chain Optimizer 150.

In some embodiments, data source performance and accuracy testing are included in Data Sources Configuration Module 320, as are data inspection and identification of data that requires cleaning and or transformation. Some transformations may be designed and/or developed in this module in some embodiments In Data Importer 330, data sources configured in Data Sources Configuration Module 320 are imported into the Orchestrated Intelligent Supply Chain Optimizer 150. In some embodiments manual and/or automated data quality monitoring may be performed in this module. Data may be transmitted directly to the Optimization Module 230, or into the System Data Archive 260 for later use by the Orchestrated Intelligent Supply Chain Optimizer 150.

In some embodiments, Data Augmenter 340 enables users to enter additional information into the system. In some embodiments or customer arrangements, manually entered or ad hoc data are expected due to limitations in customer data systems or due to challenges in accessing specific types of data. In some cases, manual data augmentation may be required to overcome a quality anomaly in imported data. Examples of manual data augmentation could include the approximate characterization of the frequency and size of delivery delays in some parts of a supply chain network. In some embodiments, a machine learning or AI algorithm will recommend a specific data representation and users will be asked to validate, confirm or adjust such a recommendation.

Data Augmenter 340 automatically imputes values for data that are missing from incoming customer data using a variety of algorithmic, machine learning and AI methods such as regression, time series forecasting, generalized low rank models, and many others. The sensitivity of the results of the supply chain optimization to changes in imputed data is computed and reported upon, allowing the customer to focus data retrieval efforts on data that is most relevant to the final output.

In the Data Transformer 350 module, incoming data may be transformed through mathematical operations to make it usable by some parts of the computation system. For example, dates of important events in the incoming data may be in a format that is not suitable for subsequent computing steps (e.g. dates in a string format) or dates may be in a variety of formats because of variations in the customer processes that generate those dates. Such data would need to be transformed and/or cleaned in this module for use in subsequent computations. This is a very general step that is required for most algorithmic and/or computational methods.

In Data Selector 360, the data to be included in a computation or user interaction is filtered or a subset of the data is otherwise selected, for example because the logged in user is not allowed to see certain sensitive data (such as prices of products, or products in a geographical region or product segment outside the scope of the current user). In some embodiments, such data selection will be performed in Data Selector 360.

In Missing Data Sensitivities Reviewer 370, certain results from Optimization Module 230 are reviewed and acted upon by users. Specifically, Optimization Module 230 computes the sensitivities of supply chain optimization results to attributes of the data resulting from Data Importer 330 and Manual Data Augmenter 340. In some embodiments, such sensitivity results can be used to identify necessary improvements either to data collection methods or to the supply chain network design to achieve the most valuable improvements to the overall system. For example, if the delivery performance of a particular node has a very large impact on the Service Levels of key products, and if the delivery performance has been estimated rather than measured over time, then the system may recommend improvements to the measurement process, so that better data can be integrated into Data Importer 330. Taking the example further, if the delivery data were well measured already, then the system may suggest that steps be taken to improve the actual delivery performance of the system in order to most significantly impact the overall system performance.

Figure 4:
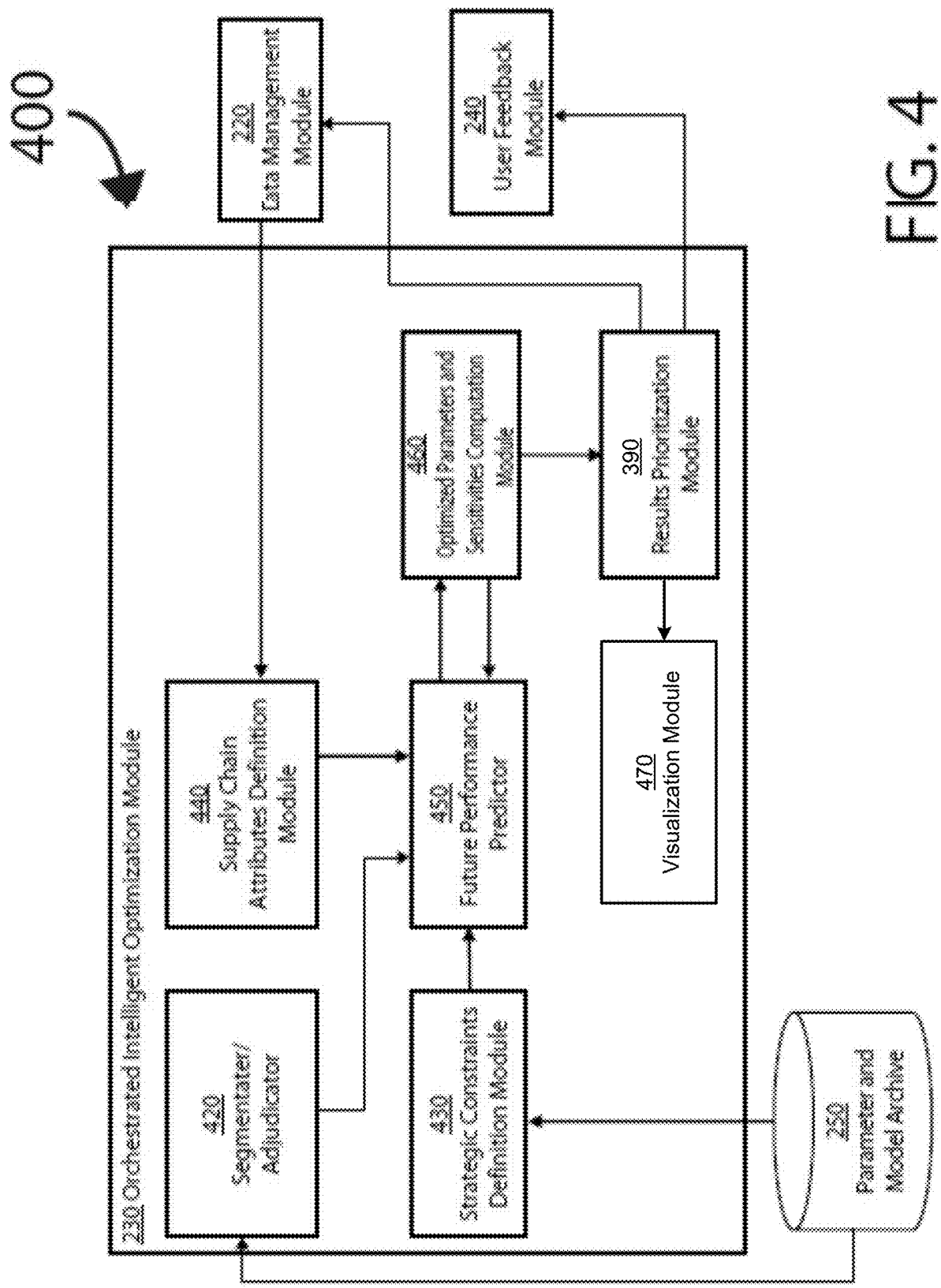

FIG. 4 illustrates the functionality of Orchestrated Intelligent Optimization Module 230 in greater detail. The primary function of the Segmenter/Adjudicator 420 is to apply grouping logic to products in order to facilitate the supply chain optimization process. In some embodiments, this may be an auto-segmenter that allows the data to automatically identify and suggest a segmentation scheme for the products in the supply chain. There can be multiple simultaneous segmentations or groupings in use at any time, which may have a variety of purposes. For example, products might be organized into classes based on two parameters: their financial value to the organization (e.g. annual revenue) and the variability of demand for the product (e.g. coefficient of variance or CoV). Products in different classes may be managed under different strategies, each of which implies different choices for supply chain parameters and stock ordering methodology (e.g. make-to-stock or make-to-order). These choices then directly influence the prediction and optimization strategies employed in Orchestrated Intelligent Supply Chain Optimizer 150. Another example of segmentation that could impact optimization results is a product type, for example drugs for oncology, HIV and hepatitis might be grouped together into three classes according to their intended uses. In some embodiments, such groupings might directly determine minimum Service Level values for products in each group. Because multiple segmentation or grouping mappings may be used simultaneously, there is also envisioned additional algorithmic structure that can harmonize among different groupings to ensure that ultimately product segmentation or grouping assignments are unique, thus ensuring that parameter assignments are also unique.

In some embodiments, the Segmenter/Adjudicator 420 module might assign groupings following a variety of methodologies. For example, in some embodiments, segmentation may be determined by the customer and passed directly to the system as a product-level attribute or as a mapping or other algorithmic formulation. In other embodiments, segmentation might be computed from data available to the system (product attributes from Data Management Module 220, for example, or information inferred from structured and unstructured sources outside of the customer system, such as text from web sites, healthcare documents, competitive or market analysis reports, or social media). In some embodiments, machine learning and AI may be used to directly construct useful segmentation strategies (for example using clustering algorithms or dimensionality reduction algorithms such as Latent Dirichlet Allocation).

The segmentation activities performed in Segmenter/Adjudicator 420 may be performed periodically (timing could be ad hoc or on a specific cadence, and timing could depend on the specific segmentation algorithm being applied) to ensure that segmentation or grouping of each product is still appropriate to the current conditions. For example, if segmentation depends upon product CoV and the measured product CoV has changed for any reason over time, then it is important for the system to detect this situation and alert the customer.

This is where the Adjudication function of Segmenter/Adjudicator 420 is performed. At any time, an appropriately permissioned user of the system might override the recommended segmentation or grouping of a specific product and set parameters manually. Additionally, when the assigned segmentation or grouping of a product changes over time, such a user may choose to accept or override the newly computed grouping. Adjudication allows users to visualize segmentation or grouping assignments and to assign new values as underlying data or corporate strategies evolve.

The Strategic Parameters and Constraints Definition Module 430 module allows the user to identify constraints on allowed supply chain configurations to ensure compliance with both physical limitations of systems and corporate governance and strategy. For example, without constraints, the Optimized Parameters and Sensitivities Computation Module 460 module might find optimal supply chain parameters settings for products individually, without any regard for the system-wide implications of such settings. As a specific example of this, individual product-level optimization may imply a very large number of frequent reorders of a group of products that are being manufactured by a specific supply site. It may not be physically possible or financially feasible for this supply site to service such a large number of reorder requests (which generally imply reconfiguring the actual manufacturing systems among many other effects), so a constraint limiting the total number of orders to a supply site would need to be included in the computations carried out by the Optimized Parameters and Sensitivities Computation Module 460. Other examples are high transportation costs on particular Supply Customer routings, Pallet spacing in a warehouse and the impact of bulky items on such a modelling outcome.

Other strategic constraints might express business imperatives, such as reducing overall inventory in parts of the supply chain, or ensuring that the risk of a stockout of a critical product or group of products be below a specific level.

The Supply Chain Attributes Definition Module 440 objective is to characterize the physical and performance characteristics of the relevant parts of a supply chain quantitatively. The definition of "relevant parts" of a supply chain in this context is any physical or logical aspect of a supply chain that materially influences the selection or computation of optimal supply chain operating parameters. For example, while a customer's supply chain globally may include supply chain networks in North America and Europe, it may be the case that these supply chains are entirely decoupled and do not influence each other's' behavior. In this case then, the "relevant parts" of the supply chain in the optimization of product delivery to Spain would include the European supply chain but not the North American supply chain. This is not to imply that relevancy is only determined by geographical factors. As another example, it may be that the performance of a leaf node of a supply chain can be completely characterized by the delivery performance of a single node upstream along with total transportation costs to the leaf node and manufacturing costs for the product. In this case, it may be quantitatively acceptable to ignore supply chain network nodes between the manufacturer and the first node upstream from the leaf node, effectively rendering those intermediate nodes as not "relevant parts" of the network for the purpose of optimizing the leaf node operating parameters. This is an important point, because it is a unique characteristic of the present invention that complete knowledge of all supply chain attributes in a customer's entire supply chain is not required to arrive at quantitatively and qualitatively optimal parameters.

In some embodiments, the Supply Chain Attributes Definition Module 440 can operate in several modes. In the first mode ("fixed network mode"), the physical attributes of the supply chain network upstream of leaf nodes are assumed to be fixed. This means that the locations and roles of different nodes in the supply chain are not considered to be free parameters of the optimization process. The actual outputs and behavior of each node may be highly variable, but the presence, role and operational characteristics of each node may not be changed by a user in this mode. To be specific, in this mode, the optimization process carried out by Orchestrated Intelligent Optimization Module 230 optimizes leaf node supply chain operational parameters such as reorder strategy, reorder frequency, safety stock level and others, subject to system-level constraints such as total orders serviced by each supply site per year. This is an optimization of certain parameters, holding the overall structure of the network fixed (although again, the actual outputs of this fixed system can be highly variable and may be modeled algorithmically by the system).

In another mode, the "fixed network end-to-end optimization mode", the locations and roles of supply chain network nodes upstream from leaf nodes are considered to be fixed, but some of their operational parameters may be optimized subject to system-level constraints. In this mode, the amount of inventory to be held, the reorder frequency and strategy of the node and the allocation rules for supplying downstream nodes are examples of parameters that might be optimized by the Orchestrated Intelligent Supply Chain Ecosystem 100.

In yet another mode, the actual locations and roles of nodes across the entire supply chain may be optimized by the Orchestrated Intelligent Supply Chain Optimizer 150 ("full end-to-end network optimization mode"). In this mode, the actual opening, closing and modification of physical facilities may be contemplated as part of the optimization. For example, it may be more efficient to open a new upstream supply warehouse to service multiple complex products than to place increased demands on an existing warehouse that has reached operational capacity.

In some embodiments, users may suggest or test certain optimizations, in others options for optimization may be suggested entirely by algorithmic means (for example using machine learning or AI), and in others a combination of both user input and algorithmic suggestions may be employed, resulting in a system that can flexibly identify optimal supply chain configurations for different customer situations.

The consequential output of Supply Chain Attributes Definition Module 440 is a sufficient characterization of the quantitative aspects of the supply chain to allow the Orchestrated Intelligent Supply Chain Optimizer 150 to carry out the computations defined in Future Performance Predictor 450.

Future Performance Predictor 450 is a cornerstone of the Orchestrated Intelligent Optimization Module 230 in which future performance of the supply chain for each fixed set of operational parameters is predicted for the supply chain defined in Supply Chain Attributes Definition Module 440. In this module, each fixed set of operational parameters can be viewed as in input feature vector to the prediction module, and the predicted performances for all input feature vectors are then both archived and passed to Optimized Parameters and Sensitivities Computation Module 460 in order to perform constrained optimization on the entire system and to arrive at recommended operational parameters.

A variety of methods can be used to determine the complete set of input feature vectors to be used in Future Performance Predictor 450. For example, a fixed grid of parameter values (for example, reorder frequency, safety stock and upstream delivery performance variability) might be created and future predictions for all of these input feature vectors computed.

In some embodiments, an adaptive approach to input feature vector selection might be used to improve computational performance. For example, input feature vectors could be selected to follow along contours of fixed Service Level, or a gradient-based search algorithm could be employed to rapidly identify input feature vectors near local optima. Many different algorithmic approaches might be employed in this phase to build up a representation of the system behavior.

Given an input feature vector for the supply chain, the predicted future behavior may be determined by a variety of algorithmic methods. For example, one might train an AI system to predict future performance based on the input feature vector and supply chain network attributes. Alternatively, one might use a statistical approach to compute probabilities of different outcomes, such as a stockout or a reorder. Additionally, one might use a simulation approach to generate an ensemble of different future behaviors and then compute estimates and confidence levels of future outcomes based upon these ensembles. It is envisioned that a variety of algorithmic techniques may applied in this phase to predict the implications of different parameter selections. For example, a formal sensitivity analysis can be performed so that an estimate of the future outcome can be broken down into its constituent uncertainties and ranked so that the customer can be warned of the items that are the most pressing.

A critical component of the Future Performance Predictor 450 process is to forecast future product demand. In some embodiments, modeling and forecasting of product demand is performed entirely within this module and using algorithmic methods developed and/or implemented within the Orchestrated Intelligent Supply Chain Optimizer 150. In other embodiments, forecast sales values and or algorithmic formulations of product sales forecasts may be incorporated and used alongside internal forecast methodologies. Such an approach allows external business knowledge of future sales events (for example, promotional events, government drug purchase tenders, new product introductions, or expiration of a drug patent) to be incorporated into the prediction process, but not at the expense of advanced analytical prediction methods that have been developed internal to Orchestrated Intelligent Supply Chain Ecosystem 100.

The function of Optimized Parameters and Sensitivities Computation Module 460 is to identify optimal supply chain parameters based on the system performance predictions computed in Future Performance Predictor 450. The AI modelling algorithm seeks to identify based on the input parameters both imported and computational the optimal configuration response to meet targeted parameter constraints with the current and predicted levels of variability as identified in the input data. The models seek the optimal balance between service and target for that part of the supply chain selected for the computation. An additional function of Optimized Parameters and Sensitivities Computation Module 460 is to compute the relative sensitivities of recommended parameters to underlying variables. Each of these will be described below.

To identify optimal supply chain parameters, this module searches the space of all possible input feature vectors (the operational parameters of the supply chain that are desired to be optimized, such as reorder frequency and safety stock level for each product) and identifies an optimal set of such parameters, subject to the system-level constraints defined in Strategic Parameters and Constraints Definition Module 430.

In some embodiments, this process may be carried out in an iterative fashion in conjunction with Future Performance Predictor 450. There is a tradeoff between the granularity and completeness of the coverage of input feature vectors in Future Performance Predictor 450, which can generate a large amount of data and consume significant compute time, and the speed of the optimization and analysis process. The Orchestrated Intelligent Optimization Module 230 is designed to exploit these tradeoffs to provide maximal flexibility, accuracy and performance (including user experience) during the identification of optimal supply chain operational parameters.

The process to compute sensitivities of recommended supply chain operational parameters to underlying factors is carried out by comparing the predicted performance of the supply chain for input feature vectors near the recommended optimal parameters. By creating an internal model of the behavior of the system in the neighborhood of each recommended optimal parameters, the Optimized Parameters and Sensitivities Computation Module 460 can identify which factors are most likely to significantly alter the results of the analysis if they were to change, or if they were to be more accurately characterized in the data coming into the system at Data Management Module 220. Such results are presented to users at Data Management Module 220 and/or User Feedback Module 240, depending upon the permissions and characteristics of each user. In some embodiments, results from this analysis might be communicated to customer outside of the Orchestrated Intelligent Supply Chain Optimizer 150.

For example, the average inventory required to maintain a high Service Level for a product might be very sensitive to the Service Level, making it prudent to investigate whether such a high Service Level is indeed appropriate for the product. In another example, the sensitivity analysis may identify a modeled delivery performance that has a very large impact on underlying product availability performance. In such a case, the availability of this information to users allows the customer to make an informed decision about the value of investing resources to either more carefully characterize the delivery performance, or to actually take steps to improve the reliability of that delivery system. In either case, access to such sensitivity information is highly valuable to the customer in determining how to allocate assets and effort in the service of improving the overall performance of the stakeholder's respective supply chain.

The Results Prioritization Module 390 performs an analysis of all of the recommended parameter settings based on the optimization in Optimized Parameters and Sensitivities Computation Module 460 and then computes importance factors that determine how the results are displayed to the user. In some cases, all of the results might be presented in a single table, sorted in an order selected by the user. However in many cases, because the number of products can be very large, it is critical to use analytical techniques to prioritize results and optimize the presentation of these results.

This is especially important given the fact that users have the option to use recommended optimal supply chain parameter values, or to override them. This means that after each analysis, there can be parameters that are far from their optimal values, and which subsequently can represent significant risk for the customer.

Hence, Results Prioritization Module 390 applies analytical techniques (machine learning and AI in some embodiments) to determine which recommendations are most important to act on, for example because they mitigate risk or have large revenue implications. While this invention is applicable to supply chains in any industry or product area, as an example, consider an HIV product for which there are significant health implications if a stockout occurs. Because of changes in demand variability, or because of previously suboptimal manually set supply chain parameters, such a product might represent a significant risk to patients and the customer. Such a product would be assigned high priority in this module so that appropriate action could be taken by a user.

These prioritized results are transmitted to either Data Management Module 220 or User Feedback Module 240, depending upon what inputs they pertain to and which kind of user is most appropriate to act upon them. For example, an adjustment to Service Level or safety stock level might be made by a Planner, but a project to investigate delivery performance at a supply chain node might be initiated by a supply chain manager or IT director.

Additionally, the Visualization Module 470 may take the output of the Results Prioritization Module 390 and generate specific graphical representations of the output for user consumption. Details of these various graphical representations will be discussed in greater detail below, in relation to FIGS. 11-13.

Figure 11:
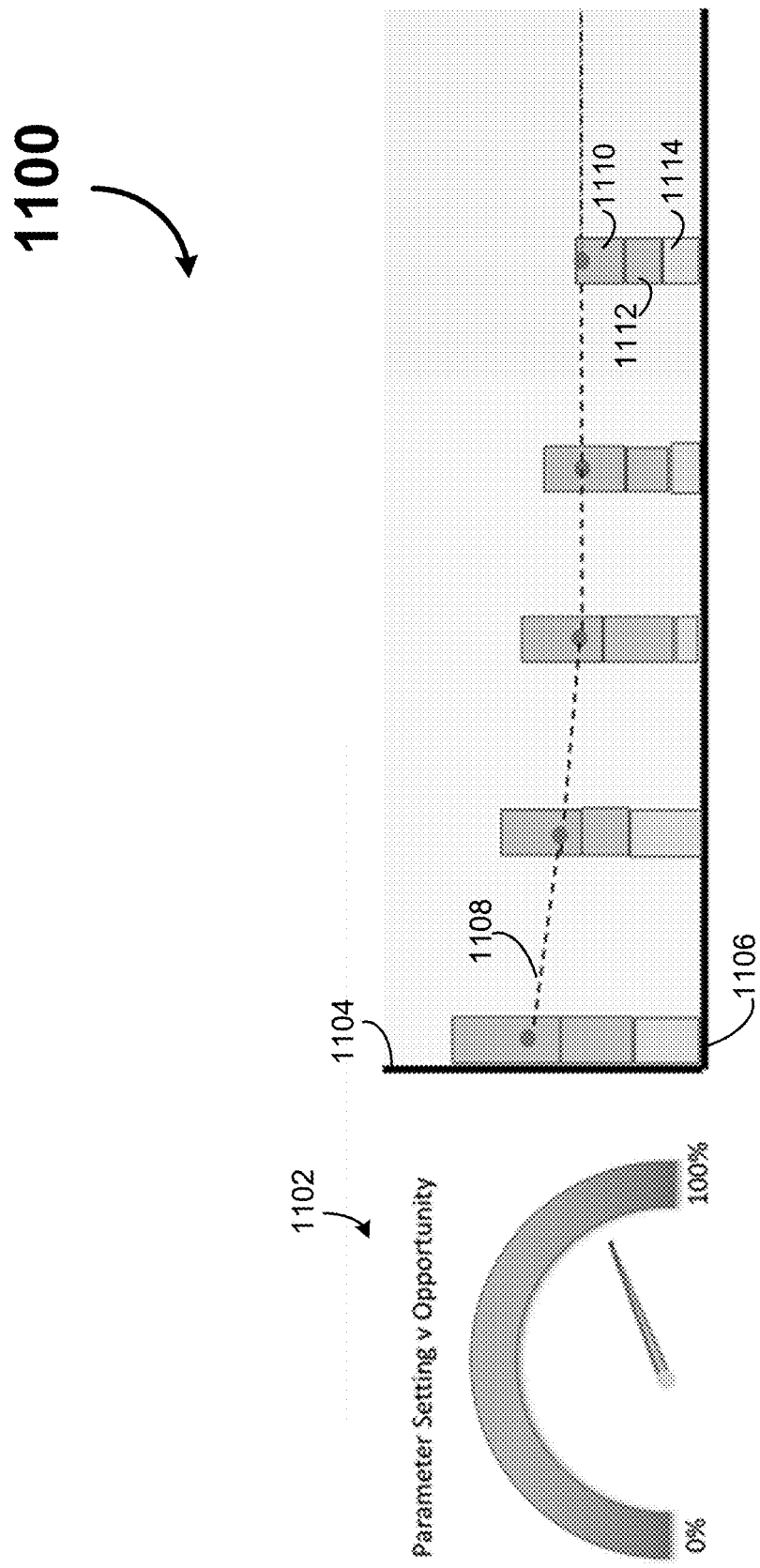
FIG. 11 provides an example representation of a graphical output of the Optimizer, including a bar graph over time illustrating improvements in supply chain management, and the degree of optimization at a given time.

In FIG. 11 a graphical interface 1100 is provided that includes a dial 1102 visualization of the parameter setting in place at a given moment, versus the opportunity calculated by the Supply Chain Optimizer 150. This dial is presented in terms of a percentage, and may be calculated by the following equation:

$$((\Sigma C_{0-n}) - (\Sigma R_{0-n}))$$

$$((\Sigma I_{0-n}) - (\Sigma R_{0-n}))$$

Where: C=the costs over selected scope of current parameters;
R=the costs over the selected scope for recommended parameters; and
I=the costs over the selected scope for initial parameters.

In addition to the percentage realized optimization dial, this graphical interface may include a graph over time of the actual performance of the supply chain relative to the optimal performance that could be achieved if all recommended optimal configuration parameters were utilized. This time series chart includes costs on the y axis 1104, and time on the x-axis 1106. The dotted line 1108 indicates the optimal cost if all recommended parameters were optimized. Note, that as circumstances change, the optimizations may become more efficient, leading to an optimization line 1108 that is not necessarily level. In some cases, due to uncontrollable circumstances, this optimal level may even increase (not shown). For example, if a hurricane disrupts normal distribution paths, the total cost of distribution may go up, and even for optimized parameters the total costs may increase. The individual bars shown on the time series chart may be broken down into constituent parts, in some embodiments. For example, warehousing 1114, shipping 1112, and final distribution 1110 may be broken out independently such that a user can determine where the costs for the supply chain are originating from.

The time series graph and dial may be filtered by segment, specific product, product family, item, sku, region, supply chain sub segment and/or by supply site. This allows for identification of low efficiency segments of the supply chain and targeted tracking of performance improvements. These graphs also enable quantitative allocation of upstream costs to downstream nodes based on detailed modeling results. Changeover costs are created when an order to a packaging or manufacturing node requires a change in the line configuration. The complex decision-making in the manufacturing site determines when orders are batched and therefore do not induce changeover costs. The algorithm models this process and allocates a share of the manufacturing node costs to downstream nodes. When a manufacturing node is included in the scope of the display, then the exact cost at the manufacturing node is used.

Figure 12:
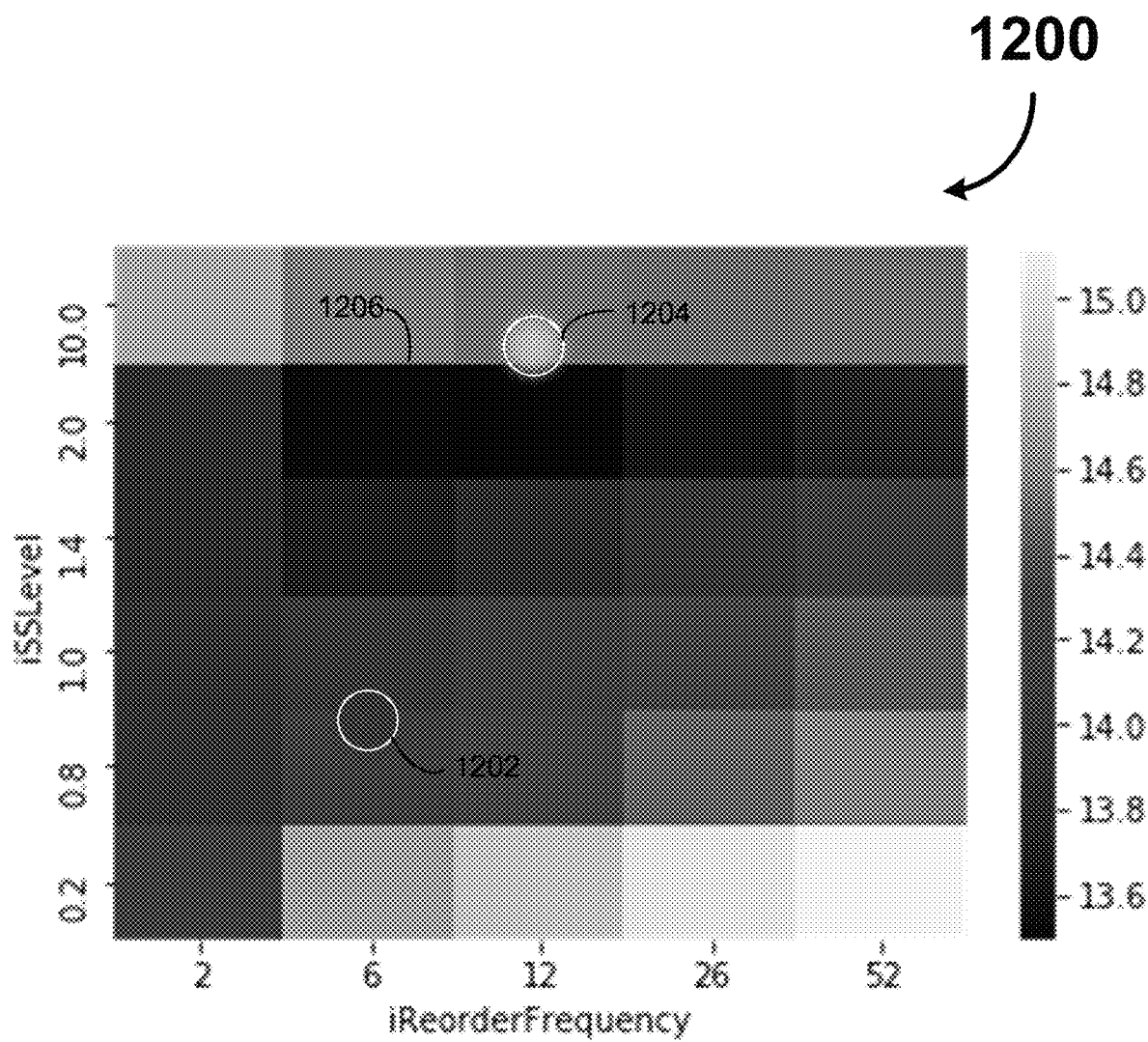
FIG. 12 provides an example representation of a graphical output of the Optimizer, including a heat map of the optimized parameters versus the existing parameters and parameters suggested by other analytical techniques.
Figure 13:
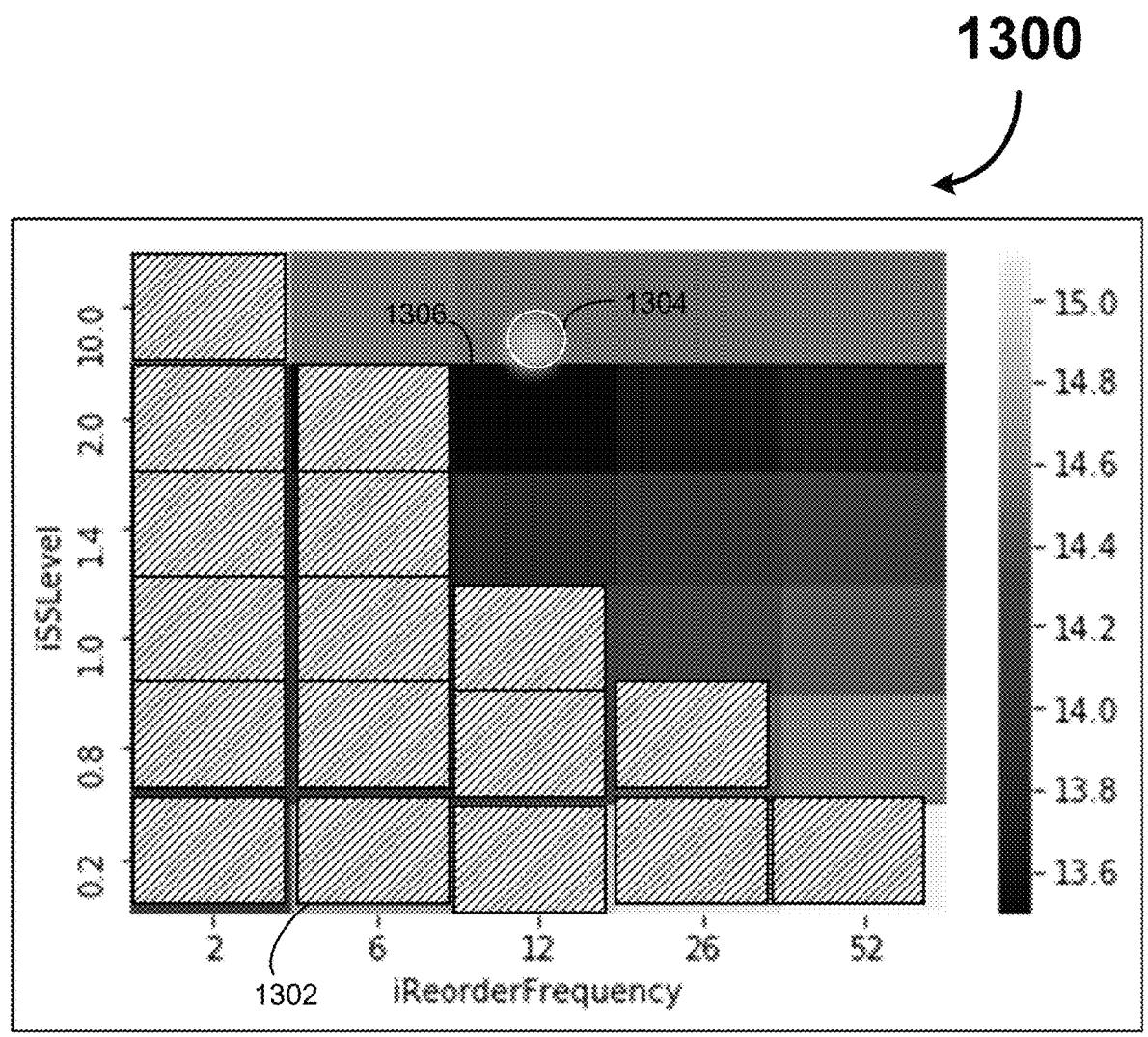
FIG. 13 provides an example representation of a graphical output of the Optimizer, including a heat map of the optimized parameters while implementing constraints in the optimization.

Turning now to FIG. 12, a heat map 1200 of optimizations based upon two parameters is illustrated. In this example graph, the reordering frequency is charted against the safety stock levels. Of course alternate sets of parameters may be employed in this analysis. The heat map illustrates the value of a key performance metric for the supply chain, for example overall costs of the supply chain, with darker locations at lower cost (better optimization). Alternative metrics include, but are not limited to, transport costs, factory changeover costs, cost of discards, cost of lost sales, supply chain on-time-in-full (OTIF), etc. It can this be seen that the parameter settings corresponding to block 1206 is the best optimization of these two parameters. In addition to the optimization results, the actual system settings may be illustrated at location 1204. It is also possible to illustrate the benchmark Naïve theoretical setting of parameters at location 1202. This theoretical setting is based on industry standard, but is incorrect, and leads to a significantly sub-par optimization (indeed this parameter setting is significantly worse than even the actual system setting 1204. The Naïve theoretical setting is a separate calculation of safety stock and order size using a basic algorithmic approach common to supply chain analysis. Specifically, safety stock is computed, without reference to order size, assuming that underlying demand is normally distributed. Order size, computed without reference to safety stock, is based on "economic order quantity," which assumes constant demand per period. This clearly illustrates the significant utility the current system brings over traditional prior art calculations of supply chain optimizations. This heat map 1200 may be filtered by product at a specific node in the supply chain.

Turning to FIG. 13, the heat map is again illustrated with a constraint overlay 1300. The overlay of constraints demonstrates tradeoffs and optimal values when additional constraints are applied. For example, a minimum Service Level constraint would disallow some solutions, as indicated by hashed regions 1302 in this figure. The current system settings is still visible 1304. In this example, application of the Service Level minimum constraint would disallow the original optimal solution, resulting in a new recommended parameter configuration 1306 for this node. Again, filtering by product at a specific node in the supply chain is possible for this heat map 1300. This allows multiple heat maps corresponding to different nodes in the supply chain network to be visualized. This presentation allows the visual comparison of current supply chain settings to optimal settings simultaneously across multiple sections of the supply chain. Manual selection of safety stock and reorder frequency in an upstream node will thus change the displays in the downstream nodes, allowing for a visual depiction of the overall optimization process and comparison with current, suboptimal settings.

Figure 5:
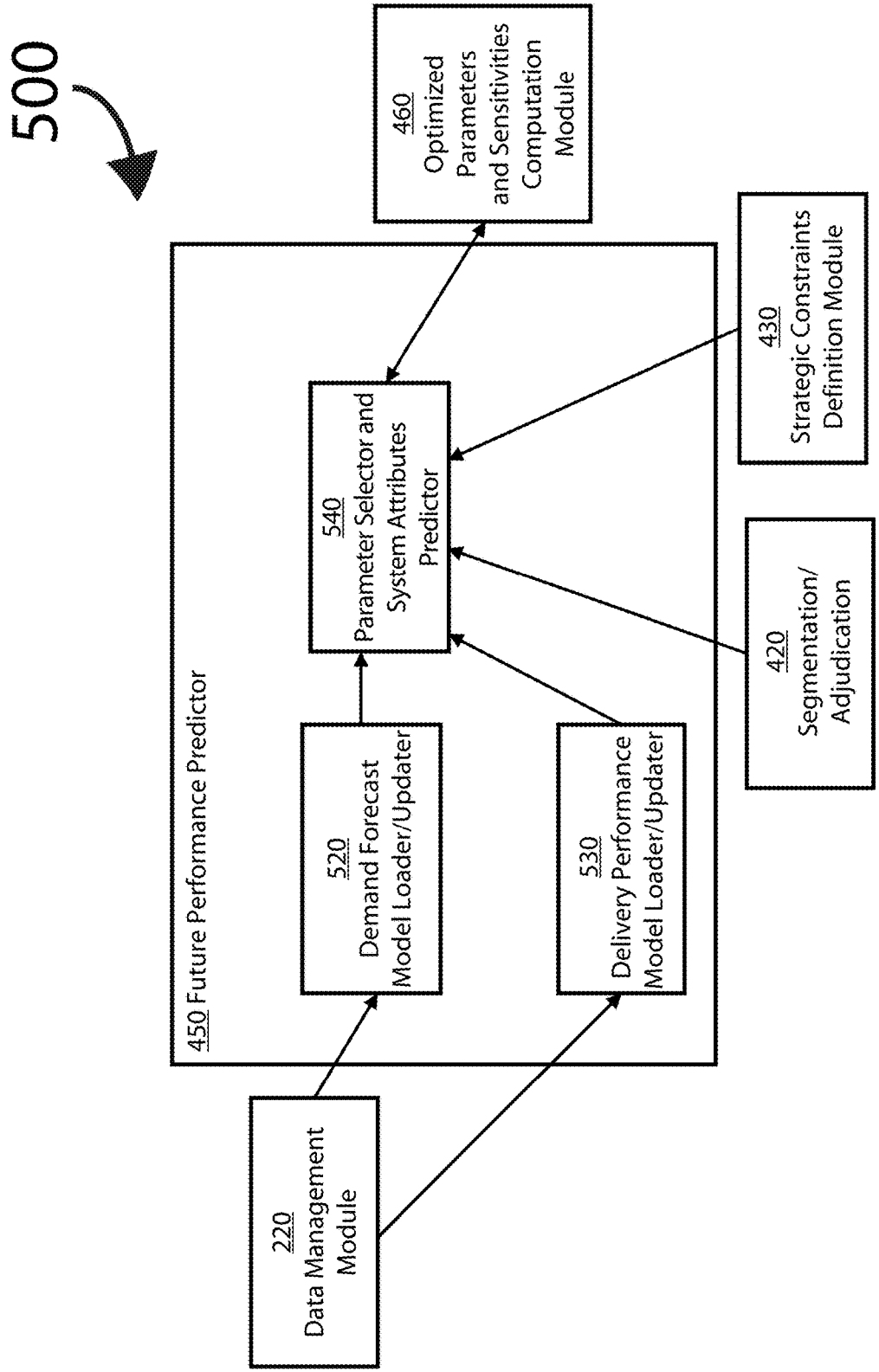

Referring now to FIG. 5, a critical component of the Future Performance Predictor 450 process is to forecast future product demand. In some embodiments, modeling and forecasting of product demand is performed entirely within this module and using algorithmic methods developed and/or implemented within the Orchestrated Intelligent Supply Chain Optimizer 150. In other embodiments, forecast sales values and or algorithmic formulations of product sales forecasts may be incorporated and used alongside internal forecast methodologies. Such an approach allows external business knowledge of future sales events (for example, promotional events, government drug purchase tenders, new product introductions, or expiration of a drug patent) to be incorporated into the prediction process, but not at the expense of advance analytical prediction methods that have been developed internal to the Orchestrated Intelligent Supply Chain Ecosystem 100.

In Demand Forecast Model Loader/Updater 520 internal modeling and forecasting assets are applied to product sales demand data from Data Management Module 220 to generate one or more product sales forecasts. In some embodiments, a customer generate forecast or forecasting model may be loaded in order to supplement the scope of future performance predictions.

Figure 10:
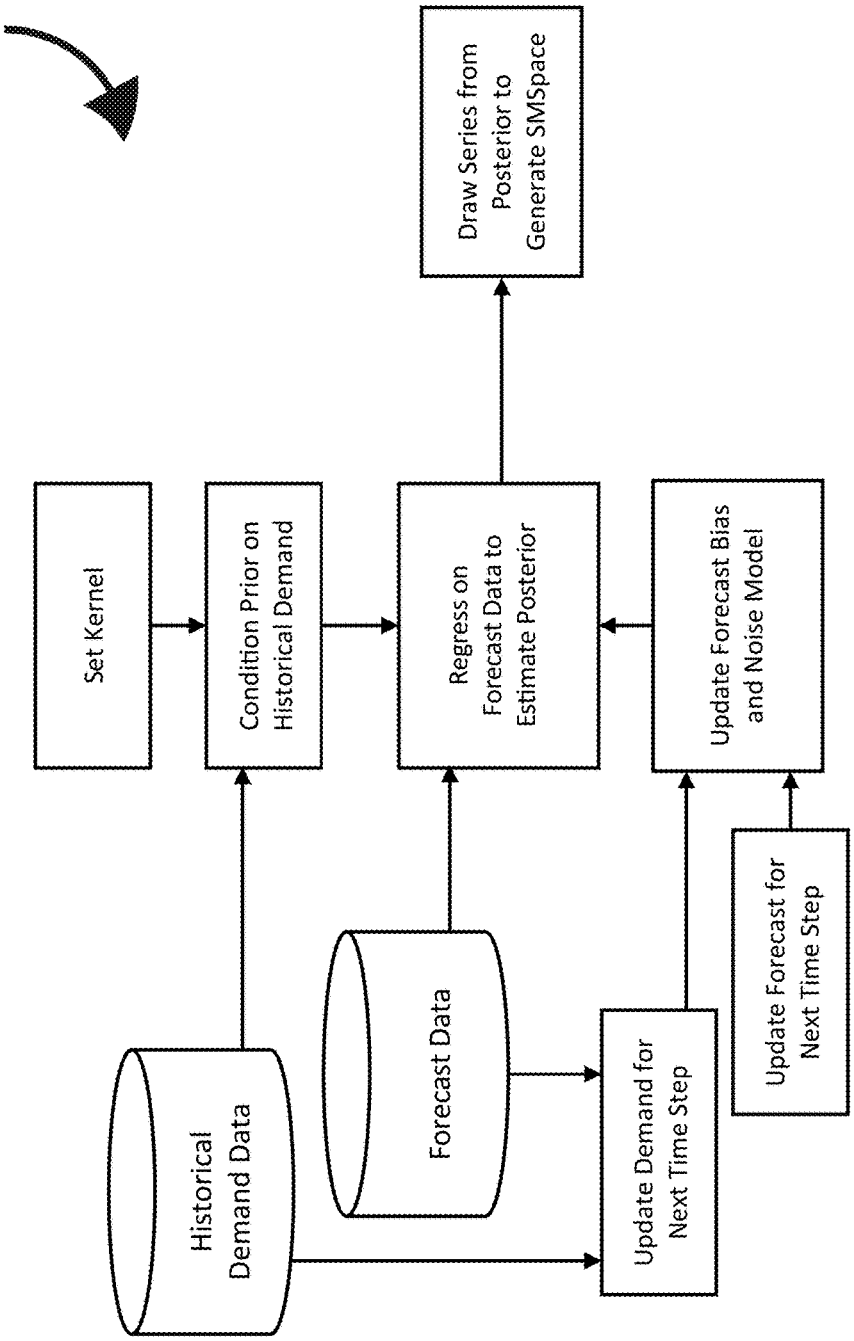
FIG. 10 illustrates an exemplary workflow for the demand forecast model loader/uploader of FIG. 5.

Referring also to FIG. 10, an exemplary workflow diagram 1000 for Demand Forecast Model Loader/Uploader 520, in some embodiments, the SMSpace is generated by drawing from a distribution of functions that have been constructed from past demand data. These past demand data are used to build a model for a prior, in this case a distribution of functions, which are then conditioned on the forecast data (which takes into account forward-looking demand forecasting, along with anything that is known about future changes in demand (such as future promotional events, price changes or changes in competitor landscape).

In a parallel process of some embodiments, forecast and demand history time series data are updated in an ongoing monitoring process and a model representing the relationship between forecast and demand is updated. This model takes into account the likely variation between sales forecast and actual realized demand. For example, if the sales forecast is consistently higher than the actual demand, then the model will learn this. By a similar token, the model will learn the variability of actual demand relative to the single sales forecast.

This model of the relationship between sales forecast and demand history can be used to generate bias and noise terms for use in the regression calculation that generates the posterior distribution from the forecast and the prior.

Functions drawn from the posterior distribution can then be used as probability-weighted future demand scenarios in the construction of a SMSpace which can then be used in the global optimization of an end-to-end supply chain.

An important component of the Future Performance Predictor 450 process is to forecast future product delivery performance throughout the supply chain network. In some embodiments, modeling and forecasting of product delivery performance is performed entirely within this module and using algorithmic methods developed and/or implemented within the Orchestrated Intelligent Supply Chain Optimizer 150 as applied to historical delivery performance data. In other embodiments, historical delivery performance data may not be available, so supplementary information such as delivery performance models developed by the customer may be used.

In Delivery Performance Model Loader/Updater 530 internal modeling and forecasting assets are applied to historical delivery performance data from Data Management Module 220 to generate one or more estimates of future delivery performance. In some embodiments, a customer generated model or performance estimate may be loaded in order to supplement the scope of future performance predictions.

As described above, Future Performance Predictor 450 is a cornerstone of the Orchestrated Intelligent Optimization Module 230 in which future performance of the supply chain for each fixed set of operational parameters is predicted for the supply chain defined in Supply Chain Attributes Definition Module 440. In this module, each fixed set of operational parameters can be viewed as in input feature vector to the prediction module, and the predicted performances for all input feature vectors are then both archived and passed to Optimized Parameters and Sensitivities Computation Module 460 in order to perform constrained optimization on the entire system and to arrive at recommended operational parameters.

A variety of methods can be used in Parameter Selector and System Attributes Predictor 540 to determine the complete set of input feature vectors to be used in Future Performance Predictor 450. For example, a fixed grid of parameter values (for example, reorder frequency, safety stock and upstream delivery performance variability) might be created and future predictions for all of these input feature vectors computed.

In some embodiments, an adaptive approach to input feature vector selection might be used to improve computational performance. For example, input feature vectors could be selected to follow along contours of fixed Service Level, or a gradient-based search algorithm could be employed to rapidly identify input feature vectors near local optima. Many different algorithmic approaches might be employed in this phase to build up a representation of the system behavior.

Given an input feature vector for the supply chain attributes, parameters and/or configuration, the predicted future behavior may be determined by a variety of algorithmic methods. For example, one might train an AI system to predict future performance based on the input feature vector and supply chain network attributes. Alternatively, one might use a statistical approach to compute probabilities of different outcomes, such as a stockout or a reorder. Additionally, one might use a simulation approach to generate an ensemble of different future behaviors and then compute estimates and confidence levels of future outcomes based upon these ensembles. It is envisioned that a variety of algorithmic techniques may applied in this phase to predict the implications of different parameter selections.

Figure 6:
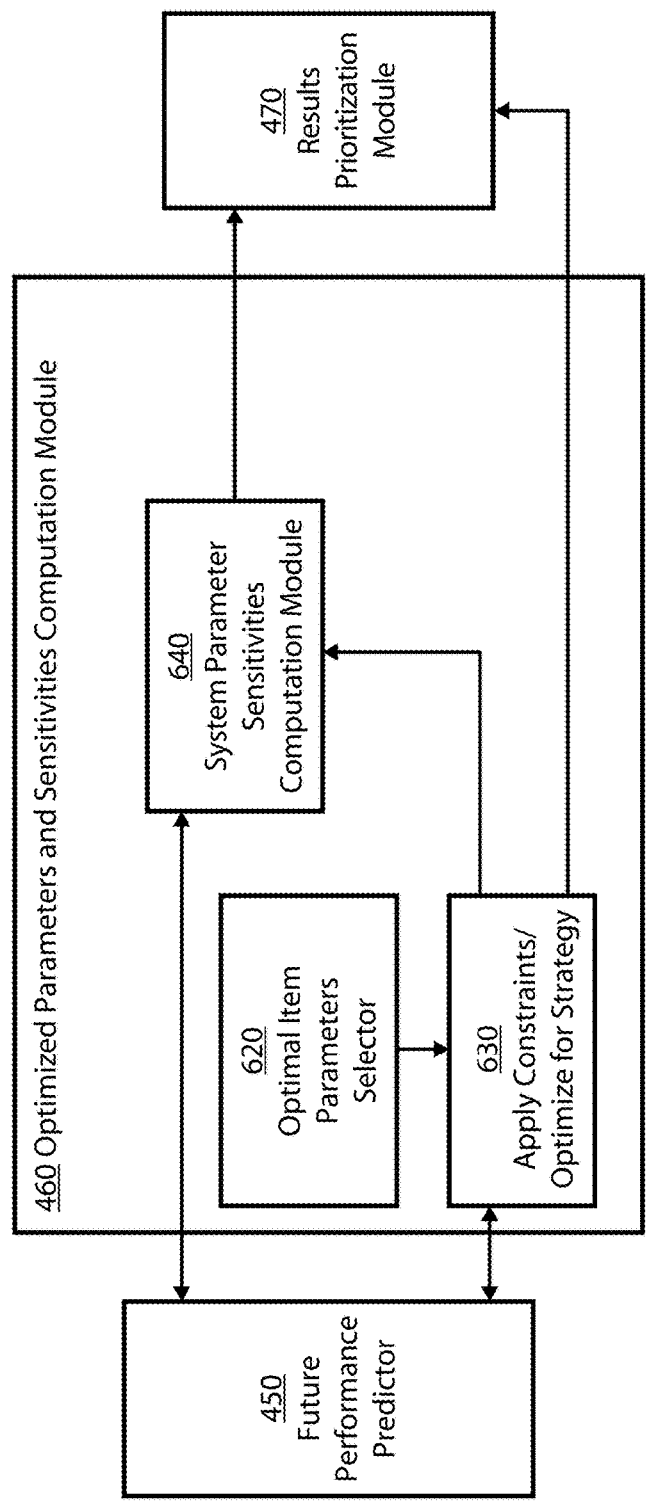

As shown in FIG. 6, the function of Optimized Parameters and Sensitivities Computation Module 460 is to identify optimal supply chain parameters based on the system performance predictions computed in Future Performance Predictor 450. An additional function of Optimized Parameters and Sensitivities Computation Module 460 is to compute the relative sensitivities of recommended parameters to underlying variables. Each of these will be described below.

To identify optimal supply chain parameters, the Optimal Item Parameters Selector 620 searches the space of all possible input feature vectors (the operational parameters of the supply chain that are desired to be optimized, such as reorder frequency and safety stock level for each product) and identifies an optimal set of such parameters, subject to the system-level constraints defined in Strategic Parameters and Constraints Definition Module 430. In some embodiments, Optimal Item Parameters Selector 620 works with Apply Constraints/Optimize for Strategy Module 630 in an iterative fashion to navigate the space of input feature vectors in order to determine the optimal set of parameters that satisfies system level constraints.

In some embodiments, this process may be carried out in an iterative fashion in conjunction with Future Performance Predictor 450. There is a tradeoff between the granularity and completeness of the coverage of input feature vectors in Future Performance Predictor 450, which can generate a large amount of data and consume significant compute time, and the speed of the optimization and analysis process. The Orchestrated Intelligent Optimization Module 230 is designed to exploit these tradeoffs to provide maximal flexibility, accuracy and performance (including user experience) during the identification of optimal supply chain operational parameters.

To identify optimal supply chain parameters, the Optimal Item Parameters Selector 620 module searches the space of all possible input feature vectors (the operational parameters of the supply chain that are desired to be optimized, such as reorder frequency and safety stock level for each product) and identifies an optimal set of such parameters, subject to the system-level constraints defined in Strategic Parameters and Constraints Definition Module 430. In some embodiments, Optimal Item Parameters Selector 620 works with Apply Constraints/Optimize for Strategy Module 630 in an iterative fashion to navigate the space of input feature vectors in order to determine the optimal set of parameters that satisfies system level constraints.

The process to compute sensitivities of recommended supply chain operational parameters to underlying factors is carried out in System Parameter Sensitivities Computation Module 640 by comparing the predicted performance of the supply chain for input feature vectors near the recommended optimal parameters. By creating an internal model of the behavior of the system in the neighborhood of each recommended optimal parameters, the Optimized Parameters and Sensitivities Computation Module 460 can identify which factors are most likely to significantly alter the results of the analysis if they were to change, or if they were to be more accurately characterized in the data coming into the system at Data Management Module 220. Such results are presented to users at Data Management Module 220 and/or User Feedback Module 240, depending upon the permissions and characteristics of each user. In some embodiments, results from this analysis might be communicated to customer outside of the Orchestrated Intelligent Supply Chain Optimizer 150.

For example, the average inventory required to maintain a high Service Level for a product might be very sensitive to the Service Level, making it prudent to investigate whether such a high Service Level is indeed appropriate for the product. In another example, the sensitivity analysis may identify a modeled delivery performance that has a very large impact on underlying product availability performance. In such a case, the availability of this information to users allows the customer to make an informed decision about the value of investing resources to either more carefully characterize the delivery performance, or to actually take steps to improve the reliability of that delivery system.

In either case, access to such sensitivity information is highly valuable to the customer in determining how to allocate assets and effort in the service of improving the overall performance of the supply chain.

In accordance with the present invention, Supply Chain Optimizer 150 provides numerous advantages over legacy planning systems including addressing at least two major challenges in the configuration and management of supply chains in almost any industry. The first challenge is that the configuration of parameters in many legacy planning systems has traditionally been manual. As a consequence it falls to the planner to manually determine the right configuration to ensure variability and risk are pro-actively managed to meet the targeted service versus cost balance for the company. There are a number of reasons why doing this manually presents an often insurmountable challenge and why Optimizer 150 is able to transform the effectiveness of the Orchestrated Intelligent Supply Chain Ecosystem 100 and the diverse supply chains that can be supported.

Firstly, setting parameters correctly requires evaluation of multiple potential current and future risk and variability possibilities. Determining whether variability of demand and supply will go up, down or remain in line with current levels has a massive bearing on what the right parameters need to be. This evaluation of risk then needs to drive the modelling of service versus cost outcomes for each item in a way that ensures whatever stock and make strategies are deployed represent an optimal balance. This calculation requires the planner to consider multiple possibilities and to identify the optimal outcome from a potential infinity of options. Secondly in typical large companies, a planner may have thousands or more products in his/her portfolio, making it nearly impossible to accurately complete the task manually. Thirdly given the complexity of getting this right, the scale of the data modelling exercise involved, and the time needed, the exercise of setting configuration parameters (if done at all) is performed intermittently and is not regularly updated to consider new data points and trends.

Supply Chain Optimizer 150 also automates the computation of supply chain configuration parameters, optimizes by using advanced modelling techniques, drives consistency in the way the exercise is completed and it maintains the optimal as variability or strategic goals change. It drives confidence and accuracy into the planning process by ensuring buffers are in the right location and sufficient to meet risk. It also enables focus by highlighting the products for which parameter changes will be most advantageous to the company to address either cost or service challenges. This results in a supply chain that can be configured to operate at an optimal level of performance at all times, and due to the on-going automation of the process, a supply chain that can be maintained at such an optimal level indefinitely. This enables companies to maintain their supply chain with the right balance of inventory and cost needed to meet the service levels they require to support their customers while holding the right levels of inventory to meet cost constraints. By constantly recalibrating the settings to take account of variations in risk levels it also ensures that the end-to-end plans reflect the priorities inherent in the data ensuring that as well as holding the right stock we are also making the right products in the right sequence of priority. For example, in pharmaceuticals, it can be critically important for a patient to receive medication consistently, implying a very high service level for some products. Such products often require special handling and storage, have short shelf lives and are costly and difficult to manufacture. The cost and difficulty of maintaining such a high service level in light of these significant system-level constraints is mitigated by the automated computation of optimal supply chain configuration parameters that is made possible by Optimizer 150. The result is higher product availability with reduced operating costs.

Hence, Optimizer 150 addresses a complex challenge in supply chain management and the configuration of the planning system that is related to the design structure of the end-to-end network itself. Determining the optimal route for product through the entire chain, where to hold stock and in what form along with replenishment strategies and make frequencies exponentially increases the complexity of the modelling exercise. This task needs to model the best design for the network and the right configuration of the parameters. In many instances, it is mathematically nearly impossible to simultaneously achieve high levels of service and moderate inventory levels because of flaws in the design of the distribution network itself. Achieving the correct end-to-end configuration requires the optimal network design as a pre-requisite.

Optimizer 150 analyses the complex flow of products through the supply chain and large number of variables impacting its behavior as a means of determining the best flow of product and the right location to buffer against risk with stock. It uses AI to decipher patterns of flow and variability across the network as well as the performance and parameter sensitivities of different parts of the supply chain to identify potential improvements. For example, in consumer retail goods, the distribution of different products can be highly complex, with different packaging and storage facilities delivering products with different transportation constraints. As an example, ice cream must be kept frozen, while other products can be transported at higher temperatures.

In sum, Orchestrated Intelligent Supply Chain Optimizer 150 uses AI analysis of the performance of the different nodes, including assessing the potential impacts of changing significant aspects of each node (for example, should a different inventory holding policy be put in place, or should two warehouse facilities be combined in some way) and through that enables automated end-to-end optimization of the nodes within the supply chain. In looking to optimize both the design of the supply chain and how that holistic chain meets risk and balances costs and service requirements significant impact is achieved in many cases simultaneously reducing inventory, transportation costs and the probability of a stockout.

The following Appendix further illustrates specific use cases of the Orchestrated Intelligent Supply Chain Optimizer 150. This includes disclosure of system access, project cannibalization, project overlap, and illustrations of results tracking and visualizations (including the importation and exporting of results). This Appendix is hereby incorporated into the specification by reference.

Figure 9A:
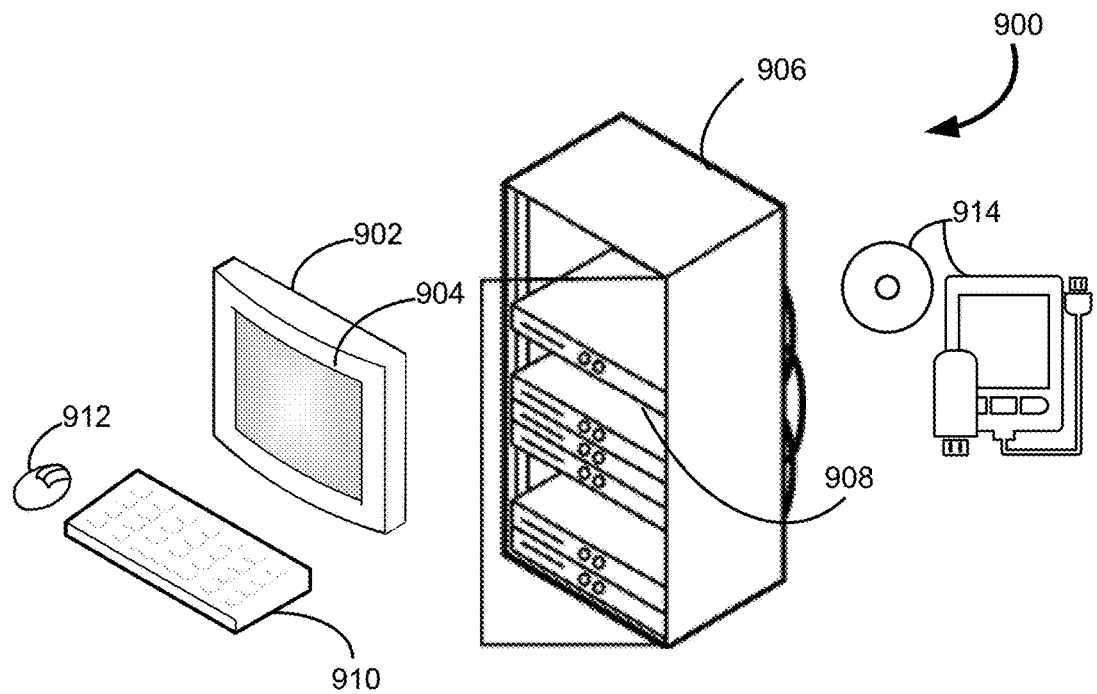
FIGS. 9A and 9B illustrate an exemplary computer system for implementing the Optimizer of FIG. 2.
Figure 9B:
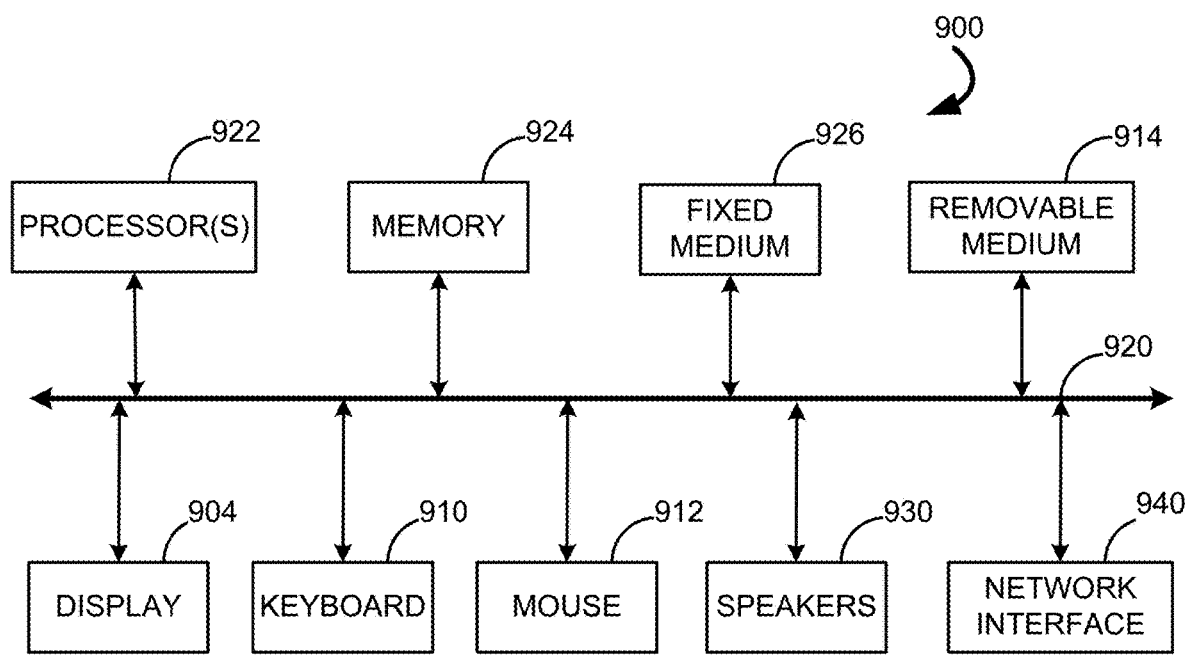

FIGS. 9A and 9B illustrate a Computer System 900, which is suitable for implementing embodiments of the present invention. FIG. 9A shows one possible physical form of the Computer System 900. Of course, the Computer System 900 may have many physical forms ranging from a printed circuit board, an integrated circuit, and a small handheld device up to a huge super computer. Computer system 900 may include a Monitor 902, a Display 904, a Housing 906, a Disk Drive and or Server Blade 908, a Keyboard 910, and a Mouse 912. External storage 914 is a computer-readable medium used to transfer data to and from Computer System 900.

FIG. 9B is an example of a block diagram for Computer System 900. Attached to System Bus 920 are a wide variety of subsystems. Processor(s) 922 (also referred to as central processing units, or CPUs) are coupled to storage devices, including Memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 926 may also be coupled bi-directionally to the Processor 922; it provides additional data storage capacity and may also include any of the computer-readable media described below. Fixed Disk 926 may be used to store programs, data, and the like and is typically a secondary storage medium (such as a hard disk) that is slower than primary storage. It will be appreciated that the information retained within Fixed Disk 926 may, in appropriate cases, be incorporated in standard fashion as virtual memory in Memory 924. Removable Storage Medium 914 may take the form of any of the computer-readable media described below.

Processor 922 is also coupled to a variety of input/output devices, such as Display 904, Keyboard 910, Mouse 912 and Speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 922 optionally may be coupled to another computer or telecommunications network using Network Interface 940. With such a Network Interface 940, it is contemplated that the Processor 922 might receive information from the network, or might output information to the network in the course of performing the above-described coder marketplace. Furthermore, method embodiments of the present invention may execute solely upon Processor 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs or Blu-ray disks and holographic devices; magneto-optical media such as floppy or optical disks; and hardware devices that are specially configured to store and execute program code, such as application-specific integrated circuits (ASICs), programmable logic devices (PLDs) and ROM and RAM devices such as USB memory sticks. Examples of computer code include machine code, such as produced by a compiler, and files containing higher level code that are executed by a computer using an interpreter.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. In addition, where claim limitations have been identified, for example, by a numeral or letter, they are not intended to imply any specific sequence.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. An orchestrated Intelligent Supply Chain Optimizer comprising:
    a Data Management Module as computer executable code, stored on non-transitory computer memory, which when executed by a computer system performs the step of configuring connections to data from a customer enterprise data system (EDS), wherein the customer data is received in at least one of an asynchronous process and a synchronous process, wherein the customer data includes fixed data related to an item, item parameter data and constraints, and wherein the customer data is incoming transformed through mathematical operations to make it usable by some parts of the computation system;
    a Parameter and Model Archive database for storing the customer data;
    a demand forecaster for consuming forecast and demand history time series data to generate a variation model of variations between sales forecasts and actual demand, generating bias and noise terms from the variation model, drawing a distribution of functions that have been constructed from past demand data, building a raw model based upon the distribution using a regression calculation with the bias and noise terms, and conditioning the raw model on forecast data to generate a demand forecast model;
    a delivery performance modeler for consuming historical delivery performance data to generate a delivery model;
    an Optimization Module as computer executable code, stored on non-transitory computer memory, which when executed by the computer system performs the step of segmenting products by defined business strategies and assigning different service level values based upon the segment, selecting a set of input feature vectors iteratively optimizing parameters for the set of input feature vectors using the demand forecast and delivery models, computing sensitivities for the set of input feature vectors by creating an internal model of behavior for each of the input feature vectors localized to the neighborhood of the optimized parameters, wherein the number of iterations is dependent upon computer processing capacity and desired accuracy for the optimization parameters; and
    improving computational performance of the Optimization Module by having an adaptive approach to input feature vector selection by following contours of a fixed service level or utilizing a gradient based search algorithm to identify input feature vectors near local optima.

2. The Optimizer of claim 1, wherein the Optimization Module comprises:
    a Segmenter Adjudicator as computer executable code, stored on non-transitory computer memory, which when executed by the computer system performs the step of segmenting a plurality of products based on currently available data and for adjudicating updated segmentation with previous segmentation results;
    a Strategic Constraints Definition Module as computer executable code, stored on non-transitory computer memory, which when executed by the computer system performs the step of identifying constraints on allowed supply chain configurations to ensure compliance with both physical limitations of systems and corporate governance and strategy;
    a Supply Chain Attributes Definition Module as computer executable code, stored on non-transitory computer memory, which when executed by the computer system performs the step of characterizing the physical and performance characteristics of the relevant parts of a supply chain quantitatively; and
    a Future Performance Predictor as computer executable code, stored on non-transitory computer memory, which when executed by the computer system performs the step of predicting future performance of the supply chain for each fixed set of operational parameters is predicted for the supply chain defined by the Supply Chain Attributes Definition Module.

3. The Optimizer of claim 2, wherein the Future Performance Predictor is further configured to predict future performance of a supply chain network for different supply chain parameter settings based on a variety of supply chain network configuration assumptions, analysis of optimal supply chain parameter settings given both strategic objectives for individual products or groups of products and system-level constraints.

4. The Optimizer of claim 1, wherein the Optimization Module is further configured to determine a current supply chain network using machine learning and AI models to recommend improvements upon an existing network and facilitate implementation of these improvements.

5. The Optimizer of claim 1, wherein the optimization is performed on a node-by-node basis for the supply chain, and wherein the computation of a leaf node that is characterized by the delivery performance of a given upstream leaf node which defines the total transportation costs to the leaf node and manufacturing costs of a product, ignores intermediate nodes between the leaf node and the upstream node for the optimizing the supply chains.

6. A method for optimizing an Orchestrated Intelligent Supply Chain comprising:
    retrieving customer data from an EDS asynchronously and/or synchronously and storing the customer data in a database;
    selecting a set of input feature vectors;
    consuming forecast and demand history time series data to generate a variation model of variations between sales forecasts and actual demand;
    generating bias and noise terms from the variation model;
    drawing a distribution of functions that have been constructed from past demand data;
    building a raw model based upon the distribution using a regression calculation with the bias and noise terms;
    conditioning the raw model on forecast data to generate a demand forecast model;
    consuming historical delivery performance data to generate a delivery model;
    iteratively applying the demand forecast and delivery models to customer data to generate supply chain optimization results by applying the demand forecast and delivery models to the selected feature vectors, wherein the optimization results include optimized parameters, wherein the number of iterations is dependent upon computer processing capacity and desired accuracy for the optimization results;

computing sensitivities for the set of input feature vectors by creating an internal model of behavior for each of the input feature vectors localized to the neighborhood of the optimized parameters;

generating display parameters for the optimization on an ongoing basis;

conditioning and presenting optimization results for optimal usefulness and impact, wherein the optimization results are remotely accessible by a user, and wherein prioritized results are transmitted to the user automatically; and improving computational performance of a system for optimizing the Orchestrated Intelligent Supply Chain by having an adaptive approach to input feature vector selection by following contours of a fixed service level or utilizing a gradient based search algorithm to identify input feature vectors near local optima.

7. The method of claim 6, wherein applying the AI models to the customer data of the Orchestrated Intelligent Supply Chain comprises:

segmenting a plurality of products based on currently available customer data;

adjudicating updated segmentation with previous segmentation results;

identifying constraints on allowed configurations of the Supply Chain to ensure compliance with both physical limitations of systems and corporate governance and strategy;

characterizing physical and performance characteristics of relevant parts of the supply chain network quantitatively; and predicting future performance of the supply chain network for each fixed set of predicted operational parameters.

8. The method of claim 6, wherein the presenting optimization results comprises:

generating a percentage dial visualization of the realized optimization;

generating a time series chart of the cost over time of the supply chain with an overlay of an optimized indicator; and generating at least one heat map of two optimized parameters.

9. The method of claim 8, wherein the at least one heat map includes reordering frequency on a first axis and safety stock levels on a second axis.

10. The method of claim 8, wherein the at least one heat map includes a position of actual parameter settings.

11. The method of claim 8, wherein the at least one heat map includes a position of a Naive theoretical calculation of a suboptimized solution for comparison against the two optimized parameters.

12. The method of claim 8, wherein the at least one heat map includes at least one constraint overlay that limits the two parameter combinations allowed for optimization.

13. The method of claim 8, wherein the at least one heat map includes a plurality of heat maps over multiple sections of the supply chain.

14. The method of claim 13, further comprising receiving a manual selection of a parameter at a given node in the supply chain and automatically updating the plurality of heat maps located in downstream nodes.

15. The method of claim 6, wherein the optimization is performed on a node-by-node basis for the supply chain, and wherein the computation of a leaf node that is characterized by the delivery performance of a given upstream leaf node which defines the total transportation costs to the leaf node and manufacturing costs of a product, ignores intermediate nodes between the leaf node and the upstream node for the optimizing the supply chains.

\* \* \* \* \*